(12) United States Patent
Futa et al.

(10) Patent No.: US 7,773,746 B2
(45) Date of Patent: Aug. 10, 2010

(54) ENCRYPTION SYSTEM, ENCRYPTION DEVICE, DECRYPTION DEVICE, PROGRAM, AND INTEGRATED CIRCUIT

(75) Inventors: Yuichi Futa, Osaka (JP); Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP)

(73) Assignee: Panasonic Corporation, Osaka (JP)

( * ) Notice: Subject to any disclaimer, the term of this patent is extended or adjusted under 35 U.S.C. 154(b) by 1002 days.

(21) Appl. No.: 10/592,387

(22) PCT Filed: Apr. 28, 2005

(86) PCT No.: PCT/JP2005/008144

§ 371 (c)(1),
(2), (4) Date: Sep. 12, 2006

(87) PCT Pub. No.: WO2005/109379

PCT Pub. Date: Nov. 17, 2005

(65) Prior Publication Data

US 2007/0274518 A1 Nov. 29, 2007

(30) Foreign Application Priority Data

May 12, 2004 (JP) .............................. 2004-142022

(51) Int. Cl.
*H04K 1/00* (2006.01)
*H04L 9/30* (2006.01)
*G06F 7/58* (2006.01)
*H04L 9/00* (2006.01)

(52) U.S. Cl. .............................. 380/30; 380/28; 380/44; 380/47; 708/250; 708/255

(58) Field of Classification Search .................. 380/28, 380/30, 44, 47; 708/250, 255
See application file for complete search history.

(56) References Cited

U.S. PATENT DOCUMENTS 6,081,597 A * 6/2000 Hoffstein et al. .............. 380/28

(Continued)

FOREIGN PATENT DOCUMENTS

JP 2000-516733 12/2000

(Continued)

OTHER PUBLICATIONS

J. Hoffstein et al., "Optimizations for NTRU," In: Public-Key Cryptography and Computational Number Theory [on line], Sep. 11-15, 2000, [retrieved on Aug. 18, 2005], retrieved from the internet: /www.ntru.com/cryptolab/articles/htm#2000_I>.*

(Continued)

*Primary Examiner*—William R Korzuch
*Assistant Examiner*—Trang Doan
(74) *Attorney, Agent, or Firm*—Wenderoth, Lind & Ponack, L.L.P.

(57) ABSTRACT

An encrypted communication system, capable of performing processing with the speed higher than the conventionally achieved speed, includes an encryption device and a decryption device sharing parameters that satisfy $p=3$ and $q=2^k$ ($k$: an integer of 2 or greater). The decryption device generates a public key and a private key using the parameters, the encryption device encrypts a plain text using the public key, and then, the decryption device decrypts the encrypted text using its own private key.

28 Claims, 10 Drawing Sheets

U.S. PATENT DOCUMENTS

| | | | |
|---|---|---|---|
| 6,298,137 B1 * | 10/2001 | Hoffstein et al. | 380/30 |
| 7,471,792 B2 * | 12/2008 | Yamamichi et al. | 380/44 |
| 2004/0078414 A1 | 4/2004 | Geiringer et al. | |
| 2004/0078570 A1 | 4/2004 | Geiringer et al. | |

FOREIGN PATENT DOCUMENTS

| | | |
|---|---|---|
| JP | 2004-341502 | 12/2004 |
| WO | 98/08323 | 2/1998 |
| WO | 01/93495 | 12/2001 |
| WO | 01/93496 | 12/2001 |
| WO | 2004/095771 | 11/2004 |

OTHER PUBLICATIONS

Joseph H. Silverman, W. Whyte, "NTRU Cryptosystems Technical Report #018, Version 1, Estimating Decryption Failure Probabilities for NTRUEncrypt", [online], 2003, [searched on Dec. 15, 2003], Internet <URL:http://www.ntru.com/cryptolab/pdf/NTRUTech018.pdf>.*

J. Hoffstein et al., "Optimizations for NTRU," In: Public-Key Cryptography and Computational Number Theory [on line], Sep. 11-15, 2000, [retrieved on Aug. 18, 2005], retrieved from the internet: <URL:http://www.ntru.com/cryptolab/articles/htm#2000_1>.

Consortium for Efficient Embedded Security, "Efficient Embedded Security Standards (EESS), EESS#1: Implementation aspects of NTRUEncrypt and NTRUSign", Version 2.0 [online], Jun. 27, 2003 (Jun. 3, 2003), [retrieved on Aug. 18, 2005], retrieved from the internet: [URL:http://grouper.ieee.org/groups/1363/lattPK/submissions.html>.

J.H. Silverman et al., NTRU Cryptosystems Technical Report—Report #18, Version 1: "Estimating Decryption Failure Probabilities for NTRUEncrypt", [online] Jun. 27, 2003), [retrieved from the internet: URL:http://www//grouper.ieee.org/groups/1363/lattPK/submissions.html> 'retrieved on Aug. 18, 2005.

J. Hoffstein et al., "NTRU: A ring based public key cryptosystem", Lecture Notes in Computer Sicence, 1423, pp. 267-288, Springer-Verlag, 1988.

J. Silverman, NTRU Cryptosystems Technical Report #011, Version 2, "Wraps, Gaps, and Lattice Constants", Mar. 2001.

The NTRU Public Key Cryptosystem—A Tutorial, <www.ntru.com/cryptolab/tutorials.htm>, pp. 1-26.

N. Howgrave-Graham et al., NTRU Cryptosystems Technical Report #004, Version 2, "A Meet-In-The-Middle Attack on an NTRU Private Key," Jun. 20, 2003.

J. Hoffstein et al., NTRU Cryptosystems Technical Report #012, Version 2, Jun. 20, 2003.

* cited by examiner

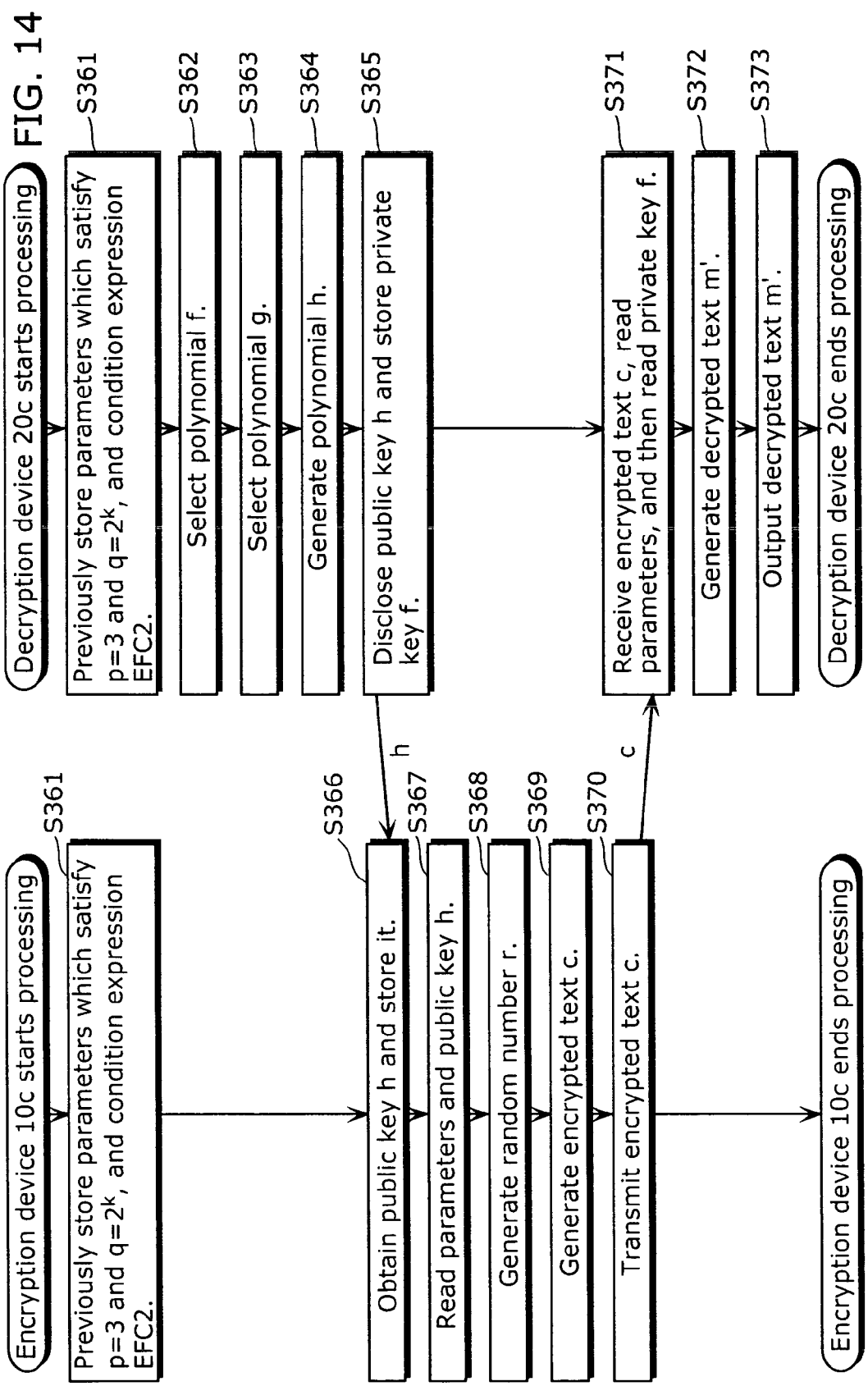

US 7,773,746 B2

ENCRYPTION SYSTEM, ENCRYPTION DEVICE, DECRYPTION DEVICE, PROGRAM, AND INTEGRATED CIRCUIT

BACKGROUND OF THE INVENTION

1. Field of Invention

The present invention relates to an encryption technique as an information security technique, and particularly to an encryption which does not cause decryption failure.

2. Description of the Related Art

Encrypted communication using a public key cryptosystem is suggested as a conventional method to realize confidential communications between a transmission apparatus and a receiving apparatus. To briefly describe the conventional encrypted communication, the transmission apparatus encrypts the contents of the communication using a public key of the receiving apparatus and transmits it, and the receiving apparatus receives the encrypted contents and obtains the original contents by decrypting it with its own private key (e.g. See Non-Patent Literature 1). It is difficult to calculate a value indicative of the private key from a value indicative of the public key. The general encrypted communication system using this method is configured by plural transmission apparatuses and receiving apparatuses. A transmission apparatus firstly acquires a public key of a partner receiving apparatus. This public key pairs with the private key possessed by the partner receiving apparatus and is made public in the system. Then, the transmission apparatus encrypts the data to be communicated, using the public key obtained in the above manner and transmits it, whereas the receiving apparatus receives such encrypted communication data, decrypts the data using its own private key so as to obtain the original data.

In 1996, an NTRU (a trademark of NTRU cryptosystems, Inc.) cryptosystem was proposed as a public key cryptosystem capable of high-speed processing (e.g. See Non-Patent Literature 2). In the NTRU cryptosystem, encryption and decryption are performed using polynomial operations which enable computation at a speed higher than the speed achieved in RSA (Rivest Shamir Adleman) cryptosystem, in which modulo exponentiation is performed in certain modulo, as well as in an elliptic-curve cryptosystem in which scalar multiplications are performed on points on an elliptic curve. It is therefore possible to perform processing at a higher speed than in the case of the existing public key cryptosystems, and thereby to perform encryption and decryption within a practical period of time even through software processing.

Thus, the encrypted communication system using the NTRU cryptosystem as a public key cryptosystem has an advantage that processing between a transmission apparatus and a receiving apparatus can be performed at a higher speed than in the case of the encrypted communication system using the existing public key cryptosystem.

The NTRU cryptosystem is described in detail in Non-Patent Literature 2, so that no detailed description is given here but a brief one will be provided below.

<NTRU Cryptosystem>

(1) NTRU Parameters

The NTRU cryptosystem uses non-negative integer parameters N, p, q, df, dg and d. The following describes the meanings of these parameters.

(i) Parameter N

The NTRU cryptosystem is a public-key cryptosystem for performing encryption and decryption by performing polynomial operations. The degree of polynomials used in the NTRU cryptosystem is determined by a parameter N mentioned above.

Polynomials used in the NTRU cryptosystem are integer coefficient polynomials of degree $(N-1)$ or lower with respect to the parameter N. When $N=5$, for example, a polynomial may be expressed by $X^4+X^3+1$, and the like. Here, "X^a" shall denote the "a"th power of X. Moreover, a public key h, a private key f, a plain text m, a random number r, and an encrypted text c used for encryption or decryption are each represented by a polynomial of degree $(N-1)$ or lower.

A polynomial is computed so that the result of a computation always gives a polynomial of degree $(N-1)$ or lower, using the relational expression "$X^N=1$" with respect to the parameter N. When $N=5$, for example, assuming that "x" denotes a product of a polynomial and a polynomial and that "·" denotes a product of an integer and a polynomial (or a product of an integer and an integer), a polynomial of degree $(N-1)$ or lower can be always derived, as follows, as a product of the polynomial $X^4+X^2+1$ and the polynomial $X^3+X$, using the relational expression "$X^5=1$":

$$(X^4+X^2+1)\times(X^3+X) = X^7 + 2\cdot X^5 + 2\cdot X^3 + X$$
$$= X^2\times 1 + 2\cdot 1 + 2\cdot X^3 + X$$
$$= 2\cdot X^3 + X^2 + X + 2.$$

(ii) Parameters p and q

An NTRU cryptosystem uses parameters p and q which are integers of 2 or greater. The coefficients in a polynomial that appears in the NTRU cryptosystem obtain remainder modulo p and q. As is described in Non-Patent Literature 2, these parameters p and q must be relatively prime.

(iii) Parameters df, dg, and d

The selection of a polynomial f that is a part of the private key handled in the NTRU cryptosystem, a polynomial g that is used together with the polynomial f at the time of generating a public key polynomial h, and a random number polynomial r used for encrypting a plain text, depends on the respective parameters df, dg, and d.

First, a polynomial f is selected so that df coefficients indicate "1", $(df-1)$ coefficients indicate "−1", and the other coefficients indicate "0". In other words, a polynomial f is a polynomial of degree $(N-1)$ or lower having N coefficients ranged from coefficients of degree 0 (constant term) to degree $(N-1)$. A polynomial f is selected so that df coefficients indicate "1", $(df-1)$ coefficients indicate "−1", and $(N-2df+1)$ coefficients indicate "0" out of the above N coefficients.

Then, a polynomial g is selected so that dg coefficients indicate "1", dg coefficients indicate "−1", and the other coefficients indicate "0". Furthermore, a random number polynomial r is selected so that d coefficients indicate "1", d coefficients indicate "−1", and the other coefficients indicate "0".

The following are three examples of NTRU parameters presented in Non-Patent Literature 2: (N, p, q, df, dg, d)=(107, 3, 64, 15, 12, 5); (N, p, q, df, dg, d)=(167, 3, 128, 61, 20, 18); and (N, p, q, df, dg, d)=(503, 3, 256, 216, 72, 55).

(2) Key Generation in NTRU Cryptosystem

As described above, the respective polynomials f and g are generated at random using the parameters df and dg in the NTRU cryptosystem. As described in Non-Patent Literature 2, a polynomial h is generated by the expression $h = Fq \times g \pmod{q}$, using a polynomial Fq having a relationship expressed by $Fq\times f=1\pmod{q}$. Here, $a\pmod{b}$ denotes remainder obtained when a is divided by b.

In the NTRU cryptosystem, (f, Fp) denotes a private key and h denotes a public key.

The expression "x=y(mod q)" is an operation which derives, as the coefficient of i-th degree in a polynomial x, remainder obtained when the coefficient of i-th degree in a polynomial y is divided by modulo q so that the remainder indicates a value ranged from "0" to "q−1" ($0 \leq i \leq N-1$). That is to say that it is an operation which derives, as a polynomial x, a polynomial to which a mod q operation (an operation to derive remainder when divided by modulo q, a remainder operation of modulo q) is executed so that each of the coefficients in the polynomial y indicate a value ranged from "0" to "(q−1)".

(3) Encryption in NTRU Cryptosystem

In the encryption based on the NTRU cryptosystem, a polynomial m being a plain text is encrypted and a polynomial c being an encrypted text is calculated. First, a random number r which is the polynomial as described above is generated at random. In other words, a random number r is a polynomial of degree (N−1) or lower, and has N coefficients of degree 0 (constant term) to degree (N−1). A polynomial (random number) r is randomly selected so that d coefficients indicate "1", d coefficients indicate "−1" and (N−2d) coefficients indicate "0" out of the N coefficients.

Then, an encrypted text c is generated, with respect to the plain text m of (N−1) degree or lower whose coefficients indicate 0, 1 or −1, by the expression indicated below, using the random number r and the public key h, where $c = p \cdot r \times h + m (\bmod q)$.

As has been described above, this operation is an operation which derives, as a polynomial c, a polynomial to which the mod q operation is performed so that each of the coefficients in the polynomial (p·r×h+m) indicates a value ranged from "0" to "(q−1)".

(4) Decryption in NTRU Cryptosystem

In the decryption based on the NTRU cryptosystem, a polynomial c which is an encrypted text is decrypted, and a polynomial m' which is a decrypted text is calculated. At the time of decryption, a polynomial a is firstly calculated, with respect to the encrypted text c, by the expression indicated below using a polynomial f which constitutes a part of the private key, where $a = f \times c (\bmod q^*)$.

Here, "(mod q*)" is different from the (mod q) operation described above, and is an operation which obtains, as the coefficient of the i-th ($0 \leq i \leq N-1$) degree in the polynomial a, remainder obtained when the coefficient of the i-th degree in the polynomial (f×c) is divided by modulo q so that the remainder indicates a value ranged from "<−q/2>+1" to "<q/2>". In other words, in the case where the coefficient indicates a value ranged from "<q−2>" to "q−1", q is subtracted from the coefficient so that the coefficient is adjusted to indicate the value within the above range. Here, <x> indicates the largest number among the numbers indicating x and lower, and may be expressed by <−1/2>=−1, for example.

Next, a polynomial b is generated with respect to the polynomial a by the expression indicated below using a parameter p, where $b = a (\bmod p)$.

Then, a decrypted text m' is calculated with respect to the polynomial b by the following expression using a polynomial Fp which is a part of the private key, where $m' = Fp \times b (\bmod p^*)$.

Note that, as described above, the operation (mod p*) is an operation which obtains, as the coefficient of i-th degree in the polynomial m', remainder obtained when the coefficient of i-th degree in the polynomial (Fp×b) is divided by modulo p so that the remainder indicates a value ranged from "<−p/2>+1" to "<p/2>".

With regard to the NTRU cryptosystem, all of the above-mentioned parameters are to satisfy p=3, but the parameters which satisfy p=2 are also disclosed (see e.g. Non-Patent Literature 3). However, as is described in Non-Patent Literature 2, in the case of p=3, the plain text m is a polynomial whose coefficients indicate one of the three values 0, 1 and −1, whereas in the case of p=2, the plain text m is a polynomial whose coefficients indicate one of the two values 0 and 1. The private key polynomials f and g and the random number r are polynomials whose coefficients indicate one of the three values 0, 1 and −1, regardless of whether p=2 or p=3.

As a key generation method based on the NTRU cryptosystem, the method for generating a public key h so as to satisfy the expression $h = p \cdot Fq \times g (\bmod q)$, and performing encryption using the expression $c = r \times h + m (\bmod q)$, is also disclosed (see e.g. Non-Patent Literature 5)

However, there is a problem with such NTRU cryptosystem as described above that a decrypted text is different from an original plain text even when an encrypted text is generated by encrypting the plain text with a public key, and the decrypted text is generated by decrypting such encrypted text with a valid private key (see e.g. Non-Patent Literature 2). This is referred to an expression that goes "a decryption error (failure) occurs". According to the NTRU cryptosystem described in Non-Patent Literature 2, the decryption failure probability depends on how the parameters are derived, however, it is known that the decryption failure probability is about $10^{\wedge}(-5)$ for any of the parameters disclosed in the above-cited reference (see e.g. Non-Patent Literature 3).

In contrast, recently a method called NTRUEncrypt scheme which is a new NTRU cryptosystem that reduces the decryption failure probability to $2^{\wedge}(-100)$ by restricting the parameters to the parameters to be mentioned later and adding calculations which reduce such probability in decryption (see e.g. Non-Patent Literature 4).

As the NTRUEncrypt scheme is described in detail in Non-Patent Literature 4, the detailed description is not given here but the brief one will follow.

<NTRUEncrypt Scheme>

(1) NTRUEncrypt Parameters

The NTRUEncrypt scheme uses non-negative integer parameters N, p, q, df, dg, and d. According to Non-Patent Literature 4, only the parameters expressed as (N, p, q, df, dg, d)=(251, 2, 239, 72, 72, 72) are disclosed as NTRUEncrypt parameters. Among the parameters used in the NTRUEncrypt scheme, the meanings of the parameters df, dg and d are different from the meanings of the parameters used in the NTRU cryptosystem.

The following describes the meanings of such parameters focusing on the difference between the NTRUEncrypt parameters and the parameters used in the NTRU cryptosystem.

(i) Parameter N

As described above, the NTRUEncrypt scheme, like the NTRU cryptosystem, is a public key cryptosystem which performs encryption and decryption by performing polynomial operations. As is the case of the NTRU cryptosystem, a polynomial handled in the NTRUEncrypt scheme is an integer coefficient polynomial of degree (N−1) or lower with respect to the parameter N, and a polynomial operation is performed using the relational expression X^N=1 so that a polynomial of degree (N−1) or lower is always derived as the result of the operation.

(ii) Parameters p and q

As is described above, the NTRUEncrypt uses the parameters p and q defined as p=2 and q=239. Such parameters p and q are relatively prime.

(iii) Parameters df, dg and d

How to select a polynomial f which is a part of the private key handled in the NTRUEncrypt, a polynomial g which is used together with the polynomial f in the generation of a public key polynomial h, and a random number polynomial r to be used for encrypting a plain text depends on the respective parameters df, dg and d.

First, a polynomial f of degree (N−1) or lower whose df coefficients indicate 1 and the other coefficients indicate 0 is selected.

Then, a polynomial of degree (N−1) or lower whose dg coefficients indicate 1 and the other coefficients indicate 0 is selected. Similarly, a polynomial of degree (N−1) or lower whose d coefficients indicate 1 and the other coefficients indicate 0 is selected as the random number r.

In other words, the difference between the NTRU cryptosystem and the NTRUEncrypt scheme is that in the NTRU cryptosystem, the polynomial whose coefficients indicate 0, 1 or −1 is selected for the polynomials f, g and r, whereas in the NTRUEncrypt scheme, the polynomial whose coefficients indicate 0 or 1 is selected for the polynomials f, g and r.

(2) Key Generation in NTRUEncrypt

As described above, in the NTRUEncrypt scheme, the polynomials f and g are generated at random using the parameters df and dg. As is described in Non-Patent Literature 4, the polynomial h is generated by the expression $h = p \cdot Fq \times g \pmod{q}$, using the polynomial Fq which satisfies $Fq \times f = 1 \pmod{q}$. The NTRUEncrypt scheme defines that (f, Fp) denotes a private key and a polynomial h denotes a public key.

(3) Encryption in NTRUEncrypt Scheme

In the NTRUEncrypt scheme, the random number r as described above is firstly generated. That is to say that a polynomial of degree (N−1) or lower whose d coefficients indicate 1 and the other coefficients indicate 0 is randomly selected, using the parameter d, as the random number r.

Then, an encrypted text c is generated, with respect to a plain text m of degree (N−1) or lower by the expression $c = r \times h + m \pmod{q}$, whose coefficients indicate 0 or 1, using the random number r and the public key h.

As described above, this operation is an operation where the polynomial c is a polynomial to which the mod q operation is performed so that each of the coefficients in the polynomial (r×h+m) indicates a value ranged from "0" to "(q−1)".

Note that there is no essential difference between the NTRU cryptosystem and the NTRUEncrypt scheme since a value of the encrypted text c indicates the same value as derived in the case of NTRU cryptosystem even in the case where a public key h is generated so as to satisfy $h = Fq \times g \pmod{q}$ in the key generation processing, and the encryption is performed using the expression $c = p \cdot r \times h + m \pmod{q}$.

(4) Decryption in NTRUEncrypt Scheme

In decryption, a polynomial a is calculated with respect to the encrypted text c by the expression $a = f \times c \pmod{q^{**}}$ using a polynomial f which is a part of the private key.

Here, (mod q**) operation is different from the above-mentioned (mod q) operation, and is an operation which obtains, as the coefficient of i-th degree in the polynomial a, remainder obtained when the coefficient of i-th degree in the polynomial (f×c) is divided by modulo q so that the remainder indicates a value located within an appropriate section of width q. The operation method is defined in detail by an algorithm called center1 or center2 described in Non-Patent Literature 4.

The algorithm center2 is described below.

(Algorithm Center 2)

Step 1: Calculation is performed using $I1 = (A(1) - p \times d \times dg)/(df(-1) \bmod q) \bmod q$, where $A = f \times c \pmod q$. Here, A(1) denotes a value derived when 1 is substituted into a variable x of the polynomial A.

Step 2: I2 shall be defined as a value obtained when an adjustment is made by adding a multiple of q to I1 so that I1 indicates a value ranged from "<(N−q)/2>+1" to "<(N+q)/2>" (I2=I1 mod q is surely satisfied).

Step 3: Calculation is performed using $J = df \times I2 + p \times d \times dg$.

Step 4: A polynomial after the adjustment of adding a multiple of q to each coefficient so that each of the coefficients in the polynomial A indicates a value ranged from "<J/N−q/2>+1" to "<J/N+q/2>" is assumed to be a polynomial $a (= f \times c \pmod{q^{**}})$.

This operation is performed for reducing the decryption failure probability.

Next, a polynomial b is generated with respect to the polynomial a by the expression $b = a \pmod p$, using a parameter p.

Then, a decrypted text m' is generated with respect to the polynomial b by the expression $m' = Fp \times b \pmod p$ using a polynomial Fp which is a part of the private key.

Note that, as to the NTRUEncrypt scheme, a method of selecting a polynomial F of degree (N−1) or lower whose df coefficients indicate 1 and the other coefficients indicate 0, and then constituting a polynomial f by the expression $f = 1 + p \cdot F$ (see e.g. Non-Patent Literature 4). As described in Non-Patent Literature 4, this method does not require polynomial multiplication to be performed between the polynomial f and the polynomial Fp in the decryption processing, since the polynomial Fp which satisfies $Fp \times f = 1 \pmod p$ is expressed by $Fp = 1 \pmod p$ due to the polynomial f expressed as in the expression $f = 1 + p \cdot F$, and a decrypted text m' can be generated by the expression $m' = a \pmod p$.

The NTRUEncrypt scheme is a method which reduces the occurrence of decryption failure more than the NTRU cryptosystem, by performing, in the decryption, processing for reducing the decryption failure probability. Nevertheless, such NTRUEncrypt scheme merely indicates that the decryption failure probability is $2^{(-100)}$ or lower, and the method enabling the probability to be 0, namely, the method of completely eliminating decryption failure is not known.

Note that both the NTRU cryptosystem and the NTRUEncrypt scheme express an operation using a polynomial, however, Patent Reference 1 expresses a polynomial as elements in a general ring R. To be more precise, the above-mentioned polynomials are described as the elements in the ring R whereas the parameters p and q are presented as ideals of the ring R.

Patent Reference 1: Japanese Unexamined Patent Publication No. 2000-516733.

Non-Patent Literature 1: *Modern Cryptography*, Mathematics in Information Science. Ser. Tatsuaki Okamoto, and Hirosuke Yamamoto, Sangyo Tosho, 1997.

Non-Patent Literature 2: Jeffery Hoffstein, Jill Pipher, and Joseph H. Silverman, "NTRU: A ring based public key cryptosystem", Lecture Notes in Computer Science, 1423, pp. 267-288, Springer-Verlag, 1998.

Non-Patent Literature 3: Joseph H. Silverman, "NTRU Cryptosystems Technical Report #011, Version 2, Wraps, Gaps, and Lattice Constants", [online], Mar. 15, 2001, [searched on Dec. 15, 2003], Internet <URL: http://www.ntru.com/cryptolab/pdf/NTRUTech011_v2.pdf>.

Non-Patent Literature 4: Joseph H. Silverman, W. Whyte, "NTRU Cryptosystems Technical Report #018, Version 1, Estimating Decryption Failure Probabilities for NTRUEncrypt", [online], 2003, [searched on Dec. 15, 2003], Internet <URL: http://www.ntru.com/cryptolab/pdf/NTRUTech018.pdf>.

Non-Patent Literature 5: "NTRU Cryptosystems, Inc., "The NTRU Public Key Cryptosystem—A Tutorial", [online], [searched on Dec. 15, 2003], Internet <URL: http://www.ntru.com/cryptolab/pdf/ntrututorials.pdf>.

Non-Patent Literature 6: Nick Howgrave—Graham, Joseph H. Silverman, and William Whyte, "NTRU Cryptosystems Technical Report #004, Version 2, A Meet-In-The-Middle Attack on an NTRU Private Key", [online], 2003, [searched on Dec. 15, 2003], Internet <URL: http://www.ntru.com/cryptolab/pdf/NTRUech018.pdf>"The NTRU Public Key Cryptosystem—A Tutorial", [online], [searched on Dec. 15, 2003], Internet <URL: http//www.ntru.com/cryptolab/pdf/NTRUTech004v2.pdf>.

Non-Patent Literature 7: Jeffery Hoffstein, Joseph H. Silverman, and William Whyte, "NTRU Cryptosystems Technical Report #012, Version 2, Estimated Breaking Times for NTRU Lattices", [online], 2003, [searched on Dec. 15, 2003], Internet <URL: http://www/ntru.com/cryptola b/pdf/NTRUTech012v2.pdf>.

BRIEF SUMMARY OF THE INVENTION

Compared with the NTRU cryptosystem, however, it is not easy, with the NTRUEncrypt scheme described above, to execute a remainder operation in modulo q of polynomial coefficients, which is to be performed in encryption and decryption since q is a prime number other than 2. Thus, a problem is that the processing speed of encryption and decryption is slower than the speed achieved in the NTRU cryptosystem.

Another problem is that when the NTRUEncrypt scheme is applied to an encrypted communication system for performing an encrypted communication between a transmission apparatus and a receiving apparatus, the receiving apparatus cannot properly decrypt the data transmitted by the transmission apparatus in some cases because the decryption failure probability is not 0.

A first object of the present invention is to provide a cryptosystem with a much higher speed by newly configuring the NTRU cryptosystem with the speed higher than that achieved in the NTRUEncrypt scheme and applying the newly-configured NTRU cryptosystem to the cryptosystem.

A second object of the present invention is to provide a cryptosystem by which a receiving apparatus can properly decrypt the data transmitted by a transmission apparatus, by configuring a new NTRU cryptosystem which principally does not let a decryption failure occur, and applying the newly-configured NTRU cryptosystem to the cryptosystem.

In order to achieve the above-mentioned objects, the cryptosystem according to the present invention is an encryption system configured of an encryption device which generates an encrypted text by encrypting a plain text according to a predetermined cryptosystem, and a decryption device which generates a decrypted text by decrypting the decrypted text according to the predetermined cryptosystem, wherein the decryption device includes: a key generation unit which generates elements f and g in a ring R, an element Fq, and an element Fp, with respect to a ring R and ideals p and q of the ring R, the ring R being a set of N-dimensional arrays and defining addition, subtraction and multiplication, the element Fq being an inverse number of f(mod q), and the element Fp being an inverse number of f(mod p), where a(mod b) here denotes remainder obtained when a is divided by b, generate, as a public key, an element h which is congruent, modulo q, to a product which is derived as a result of multiplication of the element g and the element Fq, and generate, as a private key, information for obtaining the element f and the element Fq; and a decryption unit which generates the decrypted text by decrypting the encrypted text using the private key, wherein the encryption device includes an encryption unit which generates the encrypted text by encrypting the plain text using the public key and an element r randomly selected from the ring R, and wherein all of elements in an N-dimensional array indicate 0 or 1, the N-dimensional array being the element f, g or r, or the plain text, the ideal p and the ideal q are relatively prime, and the ideal q is expressed by $q=(2\textasciicircum k)*R$, where $2\textasciicircum k$ denotes a result of 1 multiplied k times by 2 and * denotes a multiplication of the ring R.

The ideal q is defined as described above. Therefore, in the case where q is an integer, q becomes two's power so that remainder operation (mod q operation) in modulo q can be executed using bit mask operation. Therefore, with such cryptosystem, high speed processing is possible.

The key generation unit generates the element f based on a non-negative integer df which specifies the number of elements so that a value of N-dimensional array indicates 1, generates the element g based on a non-negative integer dg which specifies the number of elements so that a value of N-dimensional array indicates 1, and selects the element r based on a non-negative integer d which specifies the number of elements, each element satisfying that a value indicative of N-dimensional array indicates 1, wherein the ideal p is expressed by p=pg*R with respect to an element pg in the ring R whereas the ideal q is expressed by q=qg*R with respect to an element qg in the ring, and wherein the dimension N, the elements pg and qg, and the non-negative integers df, dg and d are derived based on failure condition information for judging whether a decryption failure has occurred or not. In addition, the failure condition information may be a conditional expression indicating a condition for preventing the occurrence of decryption failure. More precisely, the conditional expression may be expressed by Min(dg, d)+df<(qg−1)/p, where Min(a, b) indicates a smaller value between a and b.

By setting the parameters as to satisfy the above conditional expression, all the coefficients in the polynomial p·rx g+f×m respectively indicate a value ranged from "0" to "(q−1)", and thus, no decryption failures occur, as will be mentioned later.

Note that the present invention can be realized not only as the cryptosystem that includes such characteristic units, but also as the encryption method which has, as steps, the characteristic units included in the cryptosystem, and as a program which causes a computer to function as the characteristic units included in the encryption device and the decryption device that configure the cryptosystem. Needless to say, such program can be distributed via a storage medium such as a CD-ROM (Compact Disc-Read Only Memory) and via a communication network such as the Internet.

According to the present invention, it is possible to configure a cryptosystem with a processing speed higher than the speed achieved in the conventional system, by newly configuring the NTRU cryptosystem which has a processing speed higher than that achieved in the NTRUEncrypt scheme which performs the highest speed.

It is also possible to configure a cryptosystem under which a decryption device can always properly decrypt the data transmitted by an encryption device, by establishing an NTRU cryptosystem which principally prevents occurrence of decryption failure and applying such NTRU cryptosystem to the cryptosystem.

Moreover, a configuration of the NTRU cryptosystem which principally prevents occurrence of decryption failure and enables high-speed processing, and the application of such NTRU cryptosystem allow a configuration of the cryptosystem under which a decryption device can always properly decrypt the data transmitted by an encryption device and processing is performed with the speed higher than that achieved in the conventional system.

As has been described so far, it is possible to provide a cryptosystem, an encryption device and a decryption device which have not been realized conventionally, therefore, its practical value is very high.

BRIEF DESCRIPTION OF DRAWINGS

FIG. 14 is a flowchart showing an overall operation of the encrypted communication system according to the third embodiment.

Figure 1:
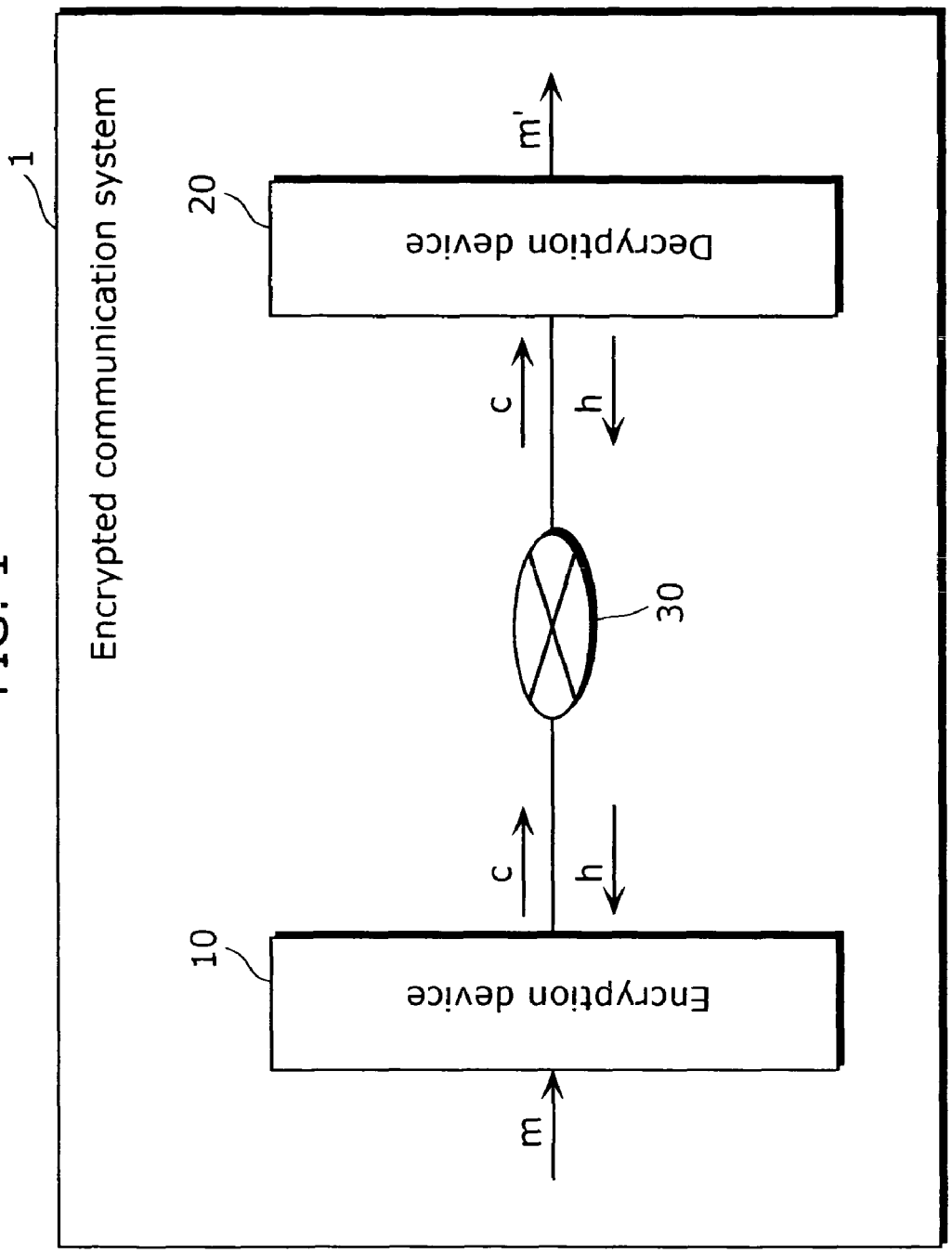
FIG. 1 is a block diagram showing an encrypted communication system according to a first embodiment of the present invention.

NUMERICAL REFERENCES 1, 1b, 1c encrypted communication system
10, 10b, 10c encryption device
11, 11b, 11c, 21, 21b, 21c parameter storage unit
12 public key storage unit
13, 13b, 13c encryption unit
20, 20b, 20c decryption device
22, 22b, 22c key generation unit
23 private key storage unit
24, 24b, 24c decryption unit
30 communication path

DETAILED DESCRIPTION OF THE INVENTION

The following describes the embodiments of the present invention with reference to the diagrams.

First Embodiment

The encrypted communication system, the encryption device and the decryption device according to the first embodiment newly configures an NTRU cryptosystem which can perform processing with the speed higher than that achieved in an NTRUEncrypt scheme which has conventionally performed the highest speed and performs encrypted communication using such newly-configured NTRU cryptosystem (this newly-configured NTRU cryptosystem which can perform processing with the speed higher than the conventional system is referred to as "first variation NTRU cryptosystem" hereinafter).

Firstly, the description of a high-speed NTRU cryptosystem will be provided below.

The following describes the first variation NTRU cryptosystem focusing on the difference between the high-speed NTRU cryptosystem and the conventional NTRUEncrypt scheme.

<First Variation NTRU Cryptosystem>

The first variation NTRU cryptosystem is modified to perform processing with the speed higher than that achieved in the conventional NTRUEncrypt scheme.

The first variation NTRU cryptosystem is different from the conventional NTRUEncrypt scheme in that it uses parameters p and q defined as $p=3$, $q=2^k$ (k: an integer of 2 or greater) and selects a polynomial whose coefficients indicate either of two values 0 and 1 for polynomials f, g, a random number polynomial r, and a plain text polynomial m. Note that the parameter p needs to be a prime relative to the parameter q, and may also indicate a value other than 3.

The following is a description of the first variation NTRU cryptosystem.

(1) Parameters of the First Variation NTRU Cryptosystem

The first variation NTRU cryptosystem has non-negative integer parameters N, p, q, df and d.

The meanings of these parameters are the same as those of the parameters in the conventional NTRUEncrypt scheme. The difference, however, is that the first variation NTRU cryptosystem generates the parameters that satisfy $p=3$ and $q=2^k$ (k: an integer of 2 or greater) and uses a polynomial whose coefficients indicate either of two values 0 and 1 as the polynomials f, g and r, although $p=3$ is defined.

(2) Key Generation in the First Variation NTRU Cryptosystem

As described above, in the first variation NTRU cryptosystem, the polynomials f and g are generated at random using the parameters df and dg. To be more precise, the polynomial f whose df coefficients indicate 1 and the other coefficients indicate 0 is generated and the polynomial g whose dg coefficients indicate 1 and the other coefficients indicate 0 is generated. A polynomial h is generated, as is described in Non-Patent Literature 2, by the expression $$h = Fq \times g \pmod{q},$$

using the polynomial Fq which satisfies Fq×f=1(mod q). A private key is represented by (f, F) and a public key is represented by h.

Here, x=y(mod q) is an operation which obtains, as the coefficient of i-th degree in the polynomial x, remainder obtained when dividing the coefficient of i-th degree in the polynomial y is divided by modulo q so that the remainder indicates a value ranged from 0 to (q−1) (0≦i≦N−1). That is to say that it is an operation, which obtains, as the polynomial x, a polynomial to which the mod q operation is performed so that each of the coefficients in the polynomial y indicates a value ranged from "0" to "(q−1)".

(3) Encryption in the First Variation NTRU Cryptosystem

In the encryption according to the first variation NTRU cryptosystem, the polynomial m whose coefficients being a plain text indicates either of two values 0 and 1 is encrypted, and then, a polynomial c being an encrypted text is calculated. First, a polynomial r being the random number as described above is generated at random. Namely, the random number r is a polynomial of degree (N−1) or lower, having N coefficients that range from coefficients of degree 0 (constant term) to degree (N−1), and the random number r is selected so that d coefficients indicate 1, d coefficients indicate −1 and (N−2d) coefficients indicate 0 out of N coefficients.

The encrypted text c is generated for the plain text m of degree (N−1) or lower whose coefficients indicate 0, 1 or −1, by the expression $$c = p \cdot r \times h + m \pmod{q},$$

using the random number r and a public key h.

This operation is an operation which obtains, as the polynomial c, a polynomial to which the mod q operation is performed so that each of the coefficients in the polynomial (p·r×h+m) indicates a value ranged from "0" to "(q−1)".

The first variation NTRU cryptosystem differs from the conventional NTRUEncrypt scheme in that the former uses a polynomial whose coefficients indicate either of two values 0 and 1 despite that p=3 is defined.

(4) Decryption in the First Variation NTRU Cryptosystem

In the decryption according to the first variation NTRU cryptosystem, the polynomial c being an encrypted text is decrypted and the polynomial m' being a decrypted text is calculated. At the time of the decryption, a polynomial a is calculated with respect to the encrypted text c by the expression $$a = f \times c \pmod{q^*},$$

using the polynomial f which is a part of the private key.

Here, (mod q*) is an operation which obtains, as the coefficient of the i th degree in the polynomial a, remainder obtained when the coefficient of the i-th degree in the polynomial (f×c) is divided by modulo q so that the remainder indicates a value ranged from "<−q/2>+1" to "<q/2>" (0≦i≦N−1). In other words, in the case where the coefficient indicates a value ranged from "<q/2>" to "q−1", the coefficient is adjusted by subtracting q from the coefficient so that the coefficient indicates the above-mentioned value. Here, <x> indicates the largest value within the values indicating x or lower. For example, <−1/2>=−1.

Next, a polynomial b is generated with respect to the polynomial a by the expression $$b = a \pmod{p},$$

using the parameter p.

Then, the decrypted text m' is calculated with respect to the polynomial b by the expression $$m' = Fp \times b \pmod{p^*},$$

using the polynomial Fp which is a part of the private key.

Note that the operation (mod p*) is an operation which obtains, as the coefficient of the i-th degree in the polynomial m', remainder obtained when the coefficient of the i-th degree in the polynomial (Fp×b) is divided by modulo p so that the remainder indicates a value ranged from "<−p/2>+1" to "<p/2>", as described above.

<Difference Between the Conventional Technique and the First Variation NTRU Cryptosystem>

The following describes that the first variation NTRU cryptosystem is capable of performing processing with the speed higher than that achieved in the conventional NTRUEncrypt scheme, and describes the difference between the first variation NTRU cryptosystem and the conventional NTRU cryptosystem or the NTRUEncrypt scheme.

(Comparison with the NTRUEncrypt Scheme)

As described above, the NTRUEncrypt scheme uses a polynomial whose coefficients indicate either of two values 0 and 1 as the private key polynomials f and g, the random number polynomial r and the plain text polynomial m. As for the parameters, only the parameters that satisfy p=2 and p=239 are disclosed.

The main operations performed in the key generation, the encryption and the decryption according to the NTRUEncrypt scheme include an operation which performs the mod q operation of the coefficients in polynomials, such as $$c = r \times h + m \pmod{q}.$$

In this case, the first variation NTRU cryptosystem can process the mod q operation with a high speed using bit mask operation, since q=239 is defined in the NTRUEncrypt scheme whereas q=2^k (k: an integer of 2 or greater) is defined in the first variation NTRU cryptosystem.

For example, in the case where the parameter q is defined as q=256 (=2^8) in the first variation NTRU cryptosystem, the mod q operation for coefficients can be realized by an operation which uses the lowest 8 bits in a bit mask operation.

In the NTRUEncrypt scheme, p=2 is defined, whereas in the first variation NTRU cryptosystem, p=3 is defined, and the NTRUEncrypt scheme performs mod p operation with the speed higher than that achieved in the first variation NTRU cryptosystem. The mod p operation, however, is performed only at the time of decryption and calculations for the reduction of decryption failure probability is required for the NTRUEncrypt scheme, while this is not the case for the first variation NTRU cryptosystem so that the increase in the amount of calculations for the mod p operation is balanced out.

Thus, as a whole including encryption and decryption, the first variation NTRU cryptosystem performs processing with the speed higher than that achieved in the NTRUEncrypt scheme.

(Difference from the Conventional Technique)

In the conventional NTRU cryptosystem, a polynomial whose coefficients indicate one of three values 0, 1 and −1 is used for the polynomials f, g, the random number polynomial r, and the plain text polynomial m is used with respect to the parameters which satisfy p=3 (in the case of p=2, the polynomials whose coefficients indicate one of three values 0, 1 and −1 are used for the polynomials other than the plain text m among these polynomials. In the case of p≠2, 3, the polynomial whose coefficients indicate one of three values 0, 1 and −1 is used for the polynomials f, g and r while the polynomial whose coefficients indicate an integer ranged from "<−p/2>+1" to "<p/2>" is used for the plain text m).

In contrast, in the conventional NTRUEncrypt scheme, the polynomial whose coefficients indicate either of two values 0 and 1 is used for the polynomials f and g, the random number polynomial r and the plain text polynomial m, with respect to the parameters that satisfy p=2.

Therefore, in the NTRU cryptosystem, ternary polynomial is normally used for the polynomials f and g, the random number polynomial r, and the plain text polynomial m, with respect to the parameters that satisfy p=3. Unlike the first variation NTRU cryptosystem as described above, the NTRU cryptosystem does not disclose how security in encryption is affected in the case of using binary polynomials for these polynomials.

However, even in the case of using, with respect to the parameters that satisfy p=3, such binary polynomial whose coefficients indicate 0 or 1, as the polynomials f and g, the random number polynomial r and the plain text polynomial m, there should be no problems regarding the security if parameters are selected appropriately as is the case of the conventional NTRU cryptosystem and NTRUEncrypt scheme.

A round-robin attack for the polynomials f, g and r, and a lattice-based attack using an LLL algorithm are known as attacking methods against the NTRU cryptosystem and the NTRUEncrypt scheme, as described in Non-Patent Literature 2.

At present, the security against the round-robin attack depends on the total number of the values possibly indicated by the polynomials f, g and r, as described in Non-Patent Literatures 2 and 6. Therefore, even in the case of using binary polynomials instead of ternary polynomials for these polynomials, the security will not be affected if selecting the parameters df, dg and d in such a manner that the total number possibly indicated by these polynomials becomes sufficiently large.

Non-Patent Literature 7 describes that the security against the LLL attack depends on the number of non-zero coefficients in the polynomials f and g. Therefore, by selecting the parameters df and dg so that the number of non-zero coefficients becomes sufficiently large, there should be no problems regarding the security.

<Method for Generating Parameters in the Variation NTRU Cryptosystem>

Below is an example of the method for generating parameters according to the first variation NTRU cryptosystem as described above.

As described above, parameters which satisfy p=3 and q=2^k (k: an integer of 2 or greater) need to be generated in the first variation NTRU cryptosystem.

Therefore, p=3 is firstly defined and then q=256 is defined, so that the mod q operation for coefficients can be achieved by operations that use only the lowest 8 bits in the bit mask operation.

Defining df=dg=d, the parameters N, df, dg and d are generated so that the values indicative of the security against the round-robin attack and the LLL attack described above indicate predetermined values or greater.

Note that the above is an example of the method for generating parameters, and another method may be used as long as the parameters which satisfy p=3 and q=2^k (k: an integer of 2 or greater) are generated thereby.

The following describes the case of using the parameters presented as (N, q, p, df, dg, d)=(251, 3, 256, 72, 72, 72) which are generated based on the method described above.

The first variation NTRU cryptosystem has been described so far, but thereinafter, the encrypted communication system, the encryption device and the decryption device according to the embodiment will be provided.

<Outline of Encrypted Communication System 1>

FIG. 1 is a diagram showing an overall configuration of an encrypted communication system 1 according to the first embodiment of the present invention. First, the encrypted communication system 1 is described with reference to the diagram.

The encrypted communication system 1 is a system for performing encrypted communication of a plain text m, and consists of an encryption device 10 and a decryption device 20, where the encryption device 10 and the decryption device 20 are mutually connected via a communication path 30.

In the encrypted communication system 1, the encryption device 10 and the decryption device 20 share the parameters represented by (N, p, q, df, dg, d)=(251, 3, 256, 72, 72, 72) as the parameters of the first variation NTRU cryptosystem.

In the encrypted communication system 1, the encryption device 10 encrypts a plain text m inputted from outside, using the first variation NTRU cryptosystem as described above, so as to generate an encrypted text c, and transmits it to the decryption device 20 via the communication path 30.

The decryption device 20 decrypts the encrypted text c received from the encryption device 10 via the communication path 30, so as to generate a decrypted text m', and then outputs it.

The encrypted communication system 1 is briefly described so far. The following describes the structure of the encrypted communication system 1, and then the operation thereof.

<Structure of Encrypted Communication System 1>

As is shown in FIG. 1, the encrypted communication system 1 is configured by the encryption device 10 and the decryption device 20 which are mutually connected via the communication path 30.

The following describes in detail such components as described above.

<Structure of Encryption Device 10>

Figure 2:
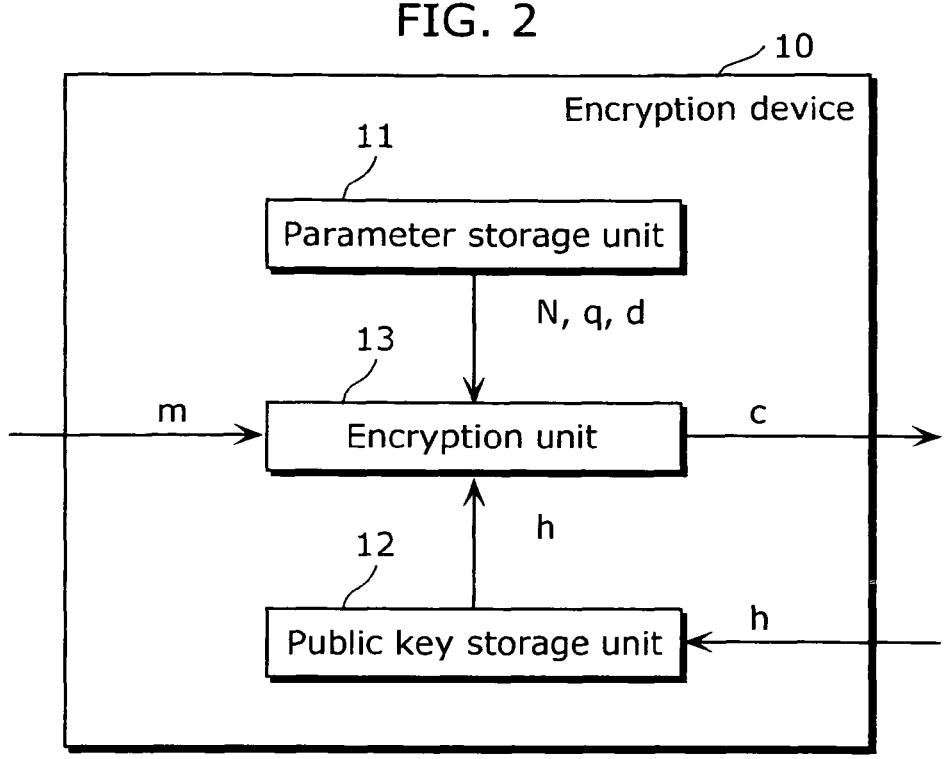
FIG. 2 is a block diagram showing a structure of an encryption device according to the first embodiment.

As shown in FIG. 2, the encryption device 10 consists of a parameter storage unit 11, a public key storage unit 12, and an encryption unit 13.

(1) Parameter Storage Unit 11

The parameter storage unit 11 is structured by a memory such as a RAM (Random Access Memory) and EEPROM (Electrically Erasable Programmable Read Only Memory), and can be accessed by the encryption unit 13 to be mentioned later.

The parameter storage unit 11 previously stores parameters which satisfy p=3 and q=2^k (k: an integer of 2 or greater). As described above, the parameter storage unit 11 previously stores the parameters as presented as (N, p, q, df, dg, d)=(251, 3, 256, 72, 72, 72).

(2) Public Key Storage Unit 12

The public key storage unit 12 is structured, for example, by a memory such as a micro computer and a RAM, and can be accessed by the encryption unit 13 to be mentioned later.

The public key storage unit 12 obtains beforehand a public key h of the decryption device 20 via the communication path 30, and stores it.

(3) Encryption Unit 13

The encryption unit 13 is structured, for example, by a micro computer, and can access the parameter storage unit 11 and the public key storage unit 12.

The encryption unit 13 reads the parameters N, q, p and d from the parameter storage unit 11, and reads the public key h from the public key storage unit 12.

The encryption unit 13 externally receives, with respect to the parameter N, a plain text m whose coefficients indicate 0 or 1 and which is expressed by a polynomial of degree (N−1) or lower.

The encryption unit 13 then selects at random a polynomial r of degree (N−1) or lower, using the parameters N and d, so that d coefficients indicate 1 and the other coefficients indicate 0. This can be achieved by selecting d number of random number values Ri ($1 \leq i \leq d$) which are ranged from "0" to "N−1" and do not indicate the same value, so that a coefficient of Ri-th degree ($1 \leq i \leq d$) indicates 1 and the other coefficients indicate 0.

The encryption unit 13 then encrypts the plain text m based on the first variation NTRU cryptosystem, using the random number polynomial r, the public key h, the parameters N and q, and generates an encrypted text c.

Then, the encryption unit 13 transmits the generated encrypted text c to the decryption device 20 via the communication path 30.

<Operation of Encryption Device 10>

The operation of the encryption device 10 will be described.

The encryption device 10 previously stores the parameters which satisfy p=3 and q=2^k (k: an integer of 2 or greater), and also stores the public key h of the decryption device 20 in the public key storage unit 12. When the plain text m expressed by the polynomial of degree (N−1) or lower is externally inputted, the encryption device 10 performs the processing indicated below, encrypts the plain text m using the first variation NTRU cryptosystem so as to generate an encrypted text c, and transmits it to the decryption device 20 via the communication path 30.

Figure 3:
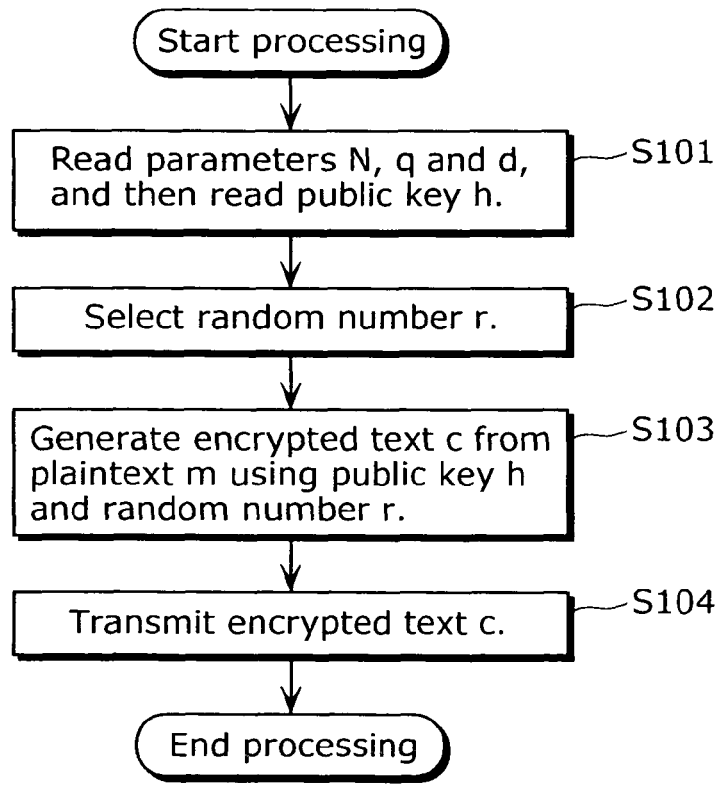
FIG. 3 is a flowchart showing the operation of the encryption device according to the first embodiment.

The following describes the processing with reference to a flowchart shown in FIG. 3.

When the plain text m is externally inputted, the encryption unit 13 firstly reads the parameters N, q, p and d from the parameter storage unit 11, and then reads the public key h from the public key storage unit 12 (Step S101).

The encryption unit 13 then selects at random the polynomial r of degree (N−1) or lower, using the parameters N and d, so that d coefficients indicate 1 and the other coefficients indicate 0 (Step S102).

The encryption unit 13 then encrypts the plain text m based on the first variation NTRU cryptosystem, using the random number polynomial r, the public key h, the parameters N and q (Step S103).

Then, the encryption 13 transmits the generated encrypted text c to the decryption device 20 via the communication path 30, and terminates the processing (Step S104).

<Structure of Decryption Device 20>

Figure 4:
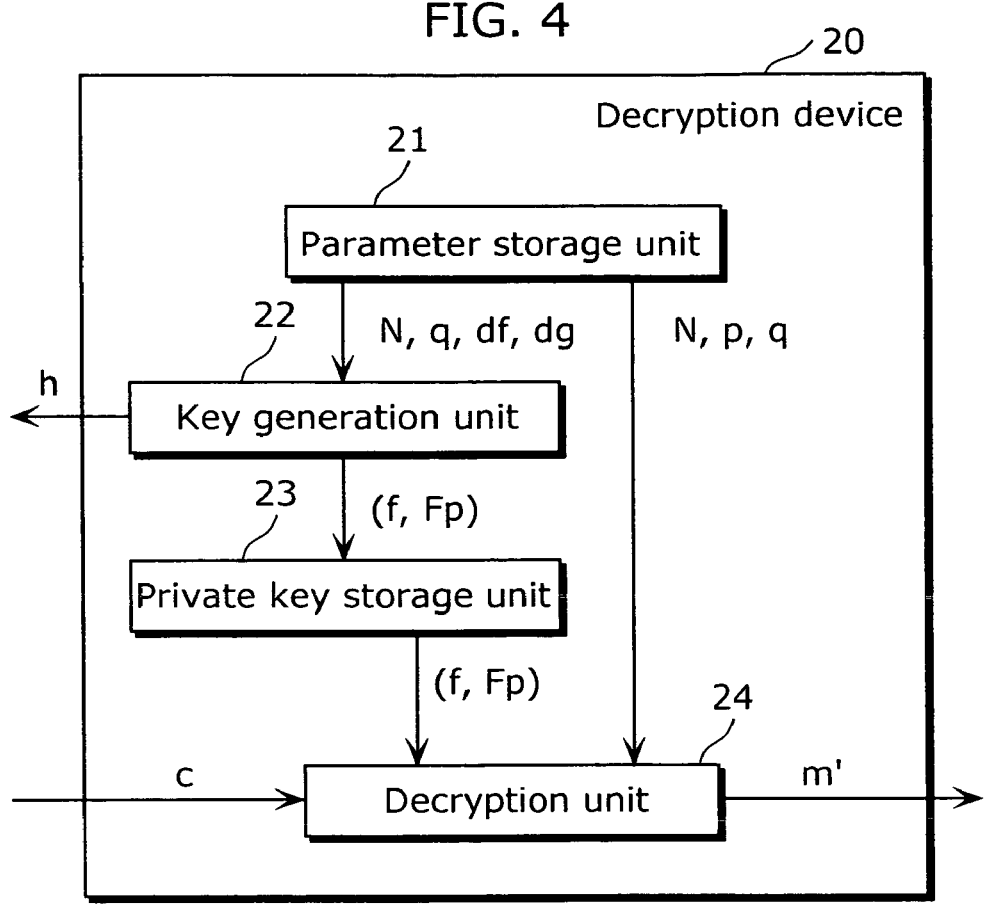
FIG. 4 is a block diagram showing a structure of a decryption device according to the first embodiment.

As shown in FIG. 4, the decryption device 20 consists of a parameter storage unit 21, a key generation unit 22, a private key storage unit 23 and a decryption unit 24.

(1) Parameter Storage Unit 21

The parameter storage unit 21 is structured by a memory such as EEPROM, and can be accessed by the key generation unit 22 and the decryption unit 24.

The parameter storage unit 21 previously stores the parameters (N, p, q, df, dg, d) as same as those stored in the parameter storage unit 11 of the encryption device 10. As described above, the parameter storage unit 21 stores in advance the parameters as represented by (N, p, q, df, dg, d)=(251, 3, 256, 72, 72, 72).

(2) Key Generation Unit 22

The key generation unit 22 is structured by a micro computer, for instance, and generates a private key (f, Fp) and a public key h according to the first variation NTRU cryptosystem.

The key generation unit 22 reads the parameters N, q, df and dg from the parameter storage unit 21, and selects the polynomial f expressed by a polynomial of degree (N−1) or lower, using the parameters N and df, so that df coefficients indicate 1 and the other coefficients indicate 0. This can be achieved, for example, by selecting df number of random number values Ri ($1 \leq i \leq df$) which is ranged from "0" to "N−1" and do not indicate the same value, so that a coefficient of Ri-th degree ($1 \leq i \leq df$) indicates 1 and the other coefficients indicate 0.

The key generation unit 22 then selects, using the parameters N and dg, the polynomial g expressed by a polynomial of degree (N−1) or lower, so that df coefficients indicate 1 and the other coefficients indicate 0.

Then, the key generation unit 22 performs the processing of the key generation according to the first variation NTRU cryptosystem as described above, and generates polynomials Fp and h.

Then, the key generation unit 22 discloses the polynomial h as a public key so that the encryption device 10 can previously obtain it, and stores a pair (f, Fp) of the polynomials f and Fp into the private key storage unit 23.

(3) Private Key Storage Unit 23

The private key storage unit 23 is structured by a memory such as a RAM, and can be accessed by the key generation unit 22 and the decryption unit 24.

The private key storage unit 23 previously stores a pair (f, Fp) of the polynomials f and Fp which are previously generated by the key generation unit 22.

(4) Decryption Unit 24

The decryption unit 24 is structured by a micro computer, for example, and can access to the parameter storage unit 21 and the private key storage unit 23.

The decryption unit 24 reads the parameters N, p and q from the parameter storage unit 21, and reads the pair (f, Fp) of the polynomials f and Fp from the private key storage unit 23.

The decryption unit 24 then receives the encrypted text c expressed by a polynomial of degree (N−1) or lower with respect to the parameter N, from the encryption device 10 via the communication path 30.

The decryption unit 24 decrypts the encrypted text c based on the first variation NTRU cryptosystem, using the private key polynomials f and Fp, the parameters N, p and q, and generates a decrypted text m'.

The decryption unit 24 then externally outputs the generated decrypted text m'.

<Operation of Decryption Device 20>

The following describes the operation of the decryption device 20.

The decryption device 20 previously stores the same parameters as those used in the encryption device 10, generates a pair (f, Fp) of the polynomials f and Fp being a private key of the decryption device 20 and the polynomial h being a public key, discloses the public key h so that the encryption device 10 can obtain it beforehand, and stores the private key (f, Fp) into the private key storage unit 23. When receiving the encrypted text c expressed by a polynomial of degree (N−1) or lower with respect to the parameter N, from the encryption device 10 via the communication path 30, the decryption device 20 performs the processing indicated below, generates a decrypted text m' using the high-speed NTRU cryptosystem as described above, and externally outputs it.

Figure 5:
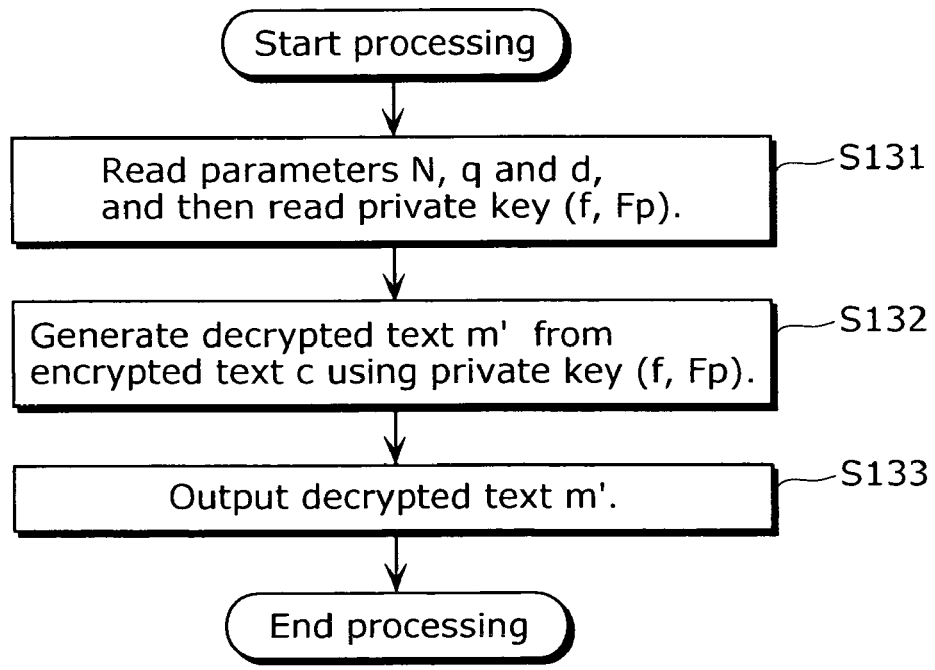
FIG. 5 is a flowchart showing the operation of the decryption device according to the first embodiment.

The following describes the processing with reference to a flowchart shown in FIG. 5.

When receiving an encrypted text polynomial c from the encryption device 10 via the communication path 30, the decryption unit 24 firstly reads the parameters N, p and q from the parameter storage unit 21, and then reads the private key (f, Fp) from the private key storage unit 23 (Step S131).

The decryption unit 24 then decrypts the encrypted text c using the private key polynomials f and Fp as well as the parameters N, p and q, based on the first variation NTRU cryptosystem, and generates a decrypted text m' (Step S132).

The decryption unit 24 then externally outputs the generated decrypted text m', and terminates the processing (Step S133).

<Operation of Encrypted Communication System 1>

Figure 6:
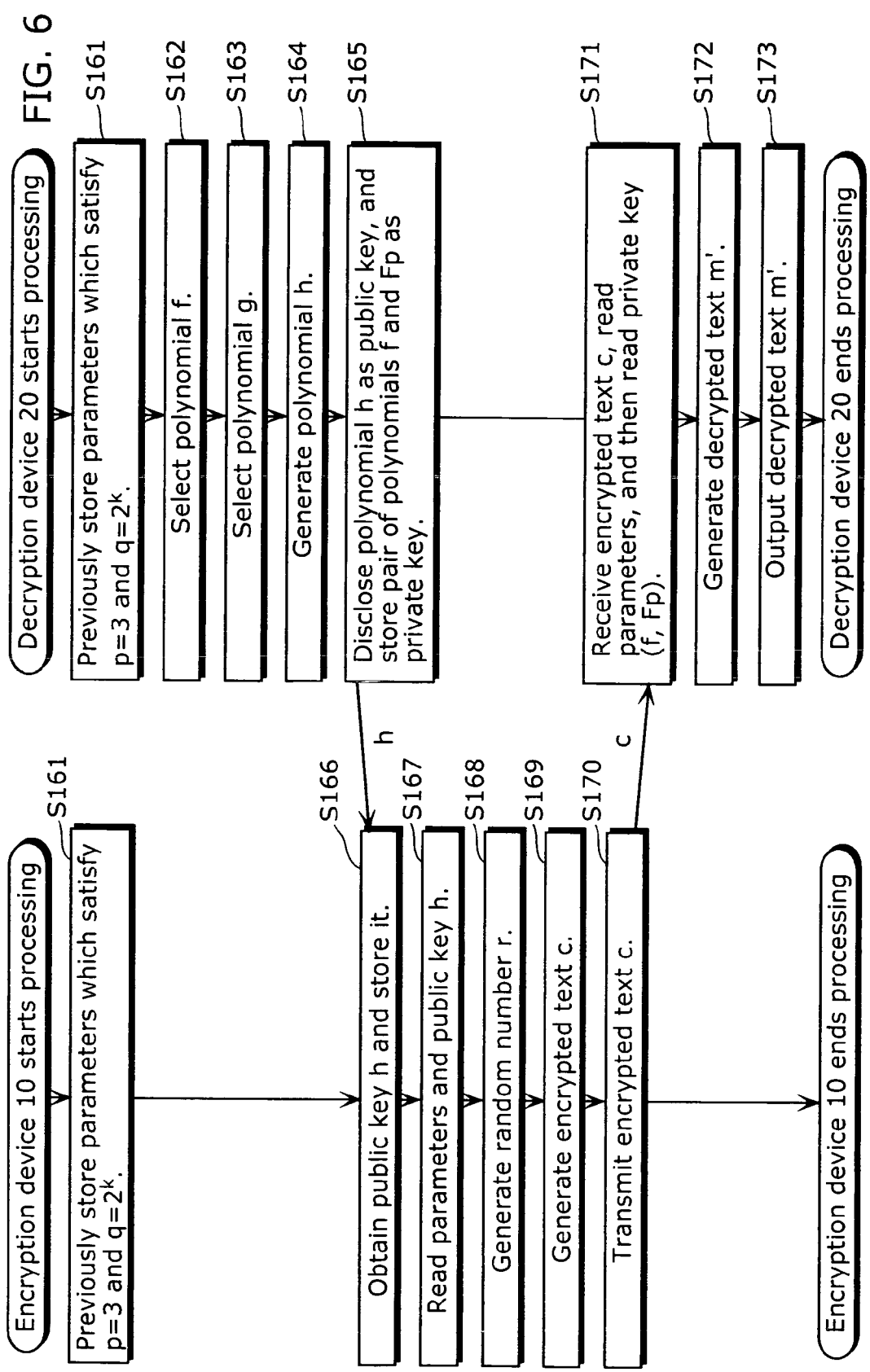
FIG. 6 is a flowchart showing an overall operation of the encrypted communication system according to the first embodiment.

Thus, the configuration of the encrypted communication system 1 has been described above. Now, the overall operation of the encrypted communication system 1 will be described with reference to a flowchart shown in FIG. 6.

First, the parameter storage units 11 and 21 previously store the parameters which satisfy $p=3$ and $q=2^k$ (Step S161).

Next, the key generation unit 22 reads the parameters N, q, df and dg from the parameter storage unit 21, and selects the polynomial f expressed by a polynomial of degree (N−1) or lower using the parameters N and df, so that df coefficients indicate 1 and the other coefficients indicate 0 (Step S162).

The key generation unit 22 then selects the polynomial g expressed by a polynomial of degree (N−1) or lower, using the parameters N and dg, so that dg coefficients indicate 1 and the other coefficients indicate 0 (Step S163).

The key generation unit 22 then performs the key generation according to the first variation NTRU cryptosystem, and generates a polynomial h (Step S164).

The key generation unit 22 then discloses the polynomial h as a public key so that the encryption device 10 can obtain it, and stores the pair (f, Fp) of the polynomials f and Fp into the private key storage unit 23, as a private key. (Step S165).

The public key storage unit 12 obtains the public key h of the decryption device 20 via the communication path 30, and stores it (Step S166).

Then, when the plain text m whose coefficients indicate 0 or 1 is inputted from outside, the encryption unit 13 reads the parameters N, q and d from the parameter storage unit 11, and then reads the public key h from the public key storage unit 12 (Step S167).

The encryption unit 13 then randomly selects the polynomial r of degree (N−1) or lower using the parameters N and d, so that d coefficients indicate 1 and the other coefficients indicate 0 (Step S168).

The encryption unit 13 then encrypts the plain text m using the random number polynomial r, the public key h, the parameters N and q, based on the first variation NTRU cryptosystem, and generates an encrypted text c (Step S169).

Then, the encryption unit 13 transmits the generated encrypted text c to the decryption device 20 via the communication path 30. (Step S170).

When receiving the encrypted text c from the encryption device 10 via the communication path 30, the decryption unit 24 reads the parameters N, p and q from the parameter storage unit 21, and then reads the private key (f, Fp) from the private key storage unit 23 (Step S171).

Then, the decryption unit 24 encrypts the encrypted text c using the private key polynomials f and Fp as well as the parameters N, p and q, based on the first variation NTRU cryptosystem, and generates a decrypted text m' (Step S172).

Then, the decryption unit 24 externally outputs the generated decrypted text m', and terminates the processing (Step S173).

<Verification of Operation in Encrypted Communication System 1>

First, the encryption device 10 and the decryption device 20 store parameters which satisfy $p=3$ and $q=2^k$ (k: an integer of 2 or greater) in Step S161.

The decryption device 20 previously generates, in Steps 162 and 163, the polynomials f and g whose coefficients indicate either of two values 0 and 1, using the parameters, and also generates, in Step S164, the public key polynomial h, based on these polynomials.

Then, the encryption device 10 generates, in Step S168, the polynomial r whose coefficients indicate either of two values 0 and 1, and encrypts, in Step S169, the plain text m whose coefficients indicate either of two values 0 and 1, using the parameters which satisfy $p=3$ and $q=2^k$ (k: an integer of 2 or greater), the public key h and the random number r, so as to generate an encrypted text c.

Then, the decryption device 20 generates, in Step S172, a decrypted text m' using the parameters which satisfy $p=3$ and $q=2^k$ (k: an integer of 2 or greater) and are stored together with the private key polynomials f and Fp.

According to such structure, it is possible to perform encrypted communication based on the first variation NTRU cryptosystem since binary polynomials are used as the polynomials f, g, the random number polynomial r and the plain text polynomial m, with respect to the parameters which satisfy $p=3$ and $q=2^k$.

Note that it is possible to perform processing with the speed higher than that achieved in the NTRUEncrypt scheme, as has been described above in the description of the first variation NTRU cryptosystem.

Thus, it is possible to newly configure the first variation NTRU cryptosystem which can perform processing with the speed higher than that achieved in the conventional NTRUEncrypt scheme. It is also possible to apply the first variation NTRU cryptosystem to an encrypted communication so as to provide the encrypted communication system with the processing speed higher than that achieved in the conventional system.

<Variation>

The embodiment described above is an example of the embodiment according to the present invention, and the present invention shall not be limited to such embodiment, but can be embodied as a variation within the scope of the subject matter. The case indicated below is also included in the scope of the present invention.

(1) In the encrypted communication 1, the parameters which satisfy the conditions $p=3$ and $q=2^k$ (k: an integer of 2 or greater) are used as the parameters of the first variation NTRU cryptosystem, however, the parameters which satisfy a conditional expression EFC1 to be mentioned later may be used instead.

Thus, description failures no longer occur in principal, as will be described later, so that it is possible to realize the encrypted communication system in which the data transmitted by an encryption device can be always properly decrypted by a decryption device.

Note that, since a decryption failure does not occur in principle, the processing of reducing decryption failure probability is unnecessary, unlike the NTRUEncrypt scheme, so that decryption can be performed as follows.

A polynomial a is calculated with respect to an encrypted text c by the expression $$a = f \times c \pmod{q},$$

using the polynomial f which is a part of the private key.

The processing of reducing the decryption failure probability is performed onto the polynomial a, as is the case of the NTRUEncrypt scheme, so that a decrypted text m' is generated.

(2) In the encrypted communication system 1, a polynomial of degree (N−1) or lower, whose df coefficients indicate 1 and the other coefficients indicate 0, is selected for the polynomial f which is a part of the private key applied in the first variation NTRU cryptosystem. However, the polynomial f may be selected by f=1+p·F, using the polynomial F of degree (N−1) or lower whose df coefficients indicate 1 and the other coefficients indicate 0, as is the case of the NTRUEncrypt scheme.

Thus, a polynomial multiplication performed with the polynomial Fp in the decryption according to the NTRU cryptosystem becomes unnecessary, as is the case of the NTRUEncrypt scheme. In this case, since the polynomial multiplication to be performed with the polynomial Fp being a part of the private key is unnecessary, a private key may be expressed as a polynomial f instead of (f, Fp).

Second Embodiment

The encrypted communication system, encryption device and decryption device according to the second embodiment improves the NTRUEncrypt scheme so as to newly configure an NTRU cryptosystem which does not, in principal, let a decryption failure occur, and to perform encrypted communication using such newly-configured NTRU cryptosystem (hereinafter the newly-configured NTRU cryptosystem, which does not, in principle, cause a decryption failure, is referred to as "second variation NTRU cryptosystem").

The second variation NTRU cryptosystem will be firstly described.

The following focuses on the difference between the second variation NTRU cryptosystem and the conventional NTRUEncrypt scheme.

<Second Variation NTRU Cryptosystem>

The second variation NTRU cryptosystem is a modified version of the conventional NTRUEncrypt scheme for preventing, in principle, the occurrence of decryption failure.

The second variation NTRU cryptosystem differs from the conventional NTRUEncrypt scheme in that it generates parameters which satisfy a conventional expression EFC1 to be mentioned later.

The following describes the second variation NTRU cryptosystem.

(1) Parameters of Second Variation NTRU Cryptosystem

The second variation NTRU cryptosystem has non-negative integer parameters N, p, q, df, dg and d. The meanings of these parameters is as same as those applied in the conventional NTRUEncrypt scheme, however, the difference between them is that it selects the parameters p, q, df, dg and d which satisfy the following conditional expression EFC1.

$$p \cdot \text{Min}(dg, d) + df < q \qquad \text{EFC1}$$

The use of the parameters that satisfy the above conventional expression EFC1 can prevent, in principle, the occurrence of decryption failure, which will be referred to later on.

(2) Key Generation in Second Variation NTRU Cryptosystem

As described above, in the second variation NTRU cryptosystem, the polynomials f and g are generated at random using the parameters df and dg. A polynomial h is generated by the expression $$h = Fq \times g \pmod{q},$$

using the polynomial Fq which satisfies $Fq \times f = 1 \pmod{q}$, as described in Non-Patent Literature 2.

(3) Encryption in Second Variation NTRU Cryptosystem

In the encryption according to the second variation NTRU cryptosystem, a polynomial m which is a plain text and whose coefficients indicate either of two values 0 and 1 is encrypted, so that a polynomial c which is an encrypted text is calculated. First, the polynomial r as described above is generated randomly. In other words, a random number r is a polynomial of degree (N−1) or lower, having N coefficients from coefficients of degree 0 (constant term) to degree (N−1). The polynomial r is randomly selected so that d coefficients indicate 1, d coefficients indicate −1 and (N−2d) coefficients indicate 0 among N coefficients.

Then, an encrypted text c is generated, with respect to the plain text m of degree (N−1) or lower whose coefficients indicate 0, 1 or −1, by the expression $$c = p \cdot r \times h + m \pmod{q},$$

using the random number r and a public key h.

(4) Decryption in Second Variation NTRU Cryptosystem

As will be mentioned later, a decryption failure does not occur, in principle, in the second variation NTRU cryptosystem, so that processing of reducing decryption failure probability is unnecessary, unlike the NTRUEncrypt scheme.

A decryption is performed as follows.

In the decryption according to the second variation NTRU cryptosystem, a polynomial c which is an encrypted text is decrypted, and a polynomial m' which is a decrypted text is calculated. At the time of the decryption, a polynomial a is firstly calculated with respect to the encrypted text c, by the expression $$a = f \times c \pmod{q^*},$$

using the polynomial f which is a part of the private key.

Next, a polynomial b is generated with respect to the polynomial a by the expression $$b = a \pmod{p},$$

using the parameter p.

Then, a decrypted text m' is calculated with respect to the polynomial b by the expression $$m' = Fp \times b \pmod{p^*},$$

using the polynomial Fp which is a part of the private key.

As described above, in the second variation NTRU cryptosystem, unlike the conventional NTRUEncrypt scheme, no processing is performed in order to reduce decryption failure probability as can be performed with an algorithm called "center1" or "center2" according to Non-Patent Literature 4.

<Reasons why a Decryption Failure does not Occur in Principle>

The following describes that a decryption failure does not occur, in principle, in the second variation NTRU cryptosystem.

The description on the conditions for preventing the occurrence of decryption failure is firstly provided, followed by the description as to why a decryption failure does not occur, in principle, in the second variation NTRU cryptosystem which uses the parameters that satisfy the above-mentioned conventional expression EFC1.

(Conditions for Preventing Occurrence of Decryption Failure)

The second variation NTRU cryptosystem is established by modifying the conventional NTRUEncrypt scheme so that no decryption failures occur.

At present, the condition for preventing the occurrence of decryption failure is not disclosed in the NTRUEncrypt scheme. However, in the case where all the coefficients in the polynomial p·r×g+f×m indicate a value ranged from "0" to "(q−1)", proper decryption can be performed and no decryption failures occur.

The reasons are provided below.

(i) In the Case of NTRU Cryptosystem

In order to illustrate a condition for preventing the occurrence of decryption failure in the NTRUEncrypt scheme, a condition for preventing the occurrence of decryption failure in the NTRU cryptosystem according to Non-Patent Literature 2 will be described.

With regard to the NTRU cryptosystem, Non-Patent Literature 2 describes that in the case where all the coefficients in the polynomial (p·r×g+f×m) respectively indicate a value ranged from "−q/2" to "q/2", it is possible to properly perform decryption so that no decryption failures occur. This attributes to the following reasons.

In the decryption according to the NTRU cryptosystem described in Non-Patent Literature 2, a polynomial a is firstly calculated with respect to an encrypted text c by the expression $$a = c \times f (\bmod q^*),$$

using a polynomial f which is a part of the private key. Here, the (mod q*) is an operation which obtains, as the coefficient of i-th degree in the polynomial a, remainder obtained when the coefficient of i-th degree in the polynomial c×f is divided by modulo q so that the remainder indicates a value ranged from "<−q/2>+1" to "<q/2>". That is to say that it is an operation which derives a polynomial resulted from a multiplication between the polynomial c and the polynomial f, and obtains, as the polynomial a, a polynomial to which the mod q operation is performed so that each of the coefficients indicates a value ranged from "<−q/2>+1" to "<q/2>".

The value resulted from the polynomial a is, as described in Non-Patent Literature 2, expressed as indicated below based on the relational expression between the plain text m and the encrypted text c as well as the relational expression between the polynomial f which is a part of the private key, and a public key h.

$$a = c \times f(\bmod q^*)$$
$$= (p \cdot r \times h + m) \times f(\bmod q^*)$$
$$= p \cdot r \times g + f \times m(\bmod q^*).$$

In other words, the polynomial a is a polynomial to which the mod q operation is performed so that each of the coefficients in the polynomial p·r×g+f×m indicates a value ranged from "−q/2" to "q/2".

In the NTRU cryptosystem, the random number r, the polynomials f and g, and the plain text m are the polynomials whose coefficients respectively indicate 0, 1 or −1. Therefore, the polynomial p·r×g+f×m is a polynomial whose coefficients possibly indicate negative values.

In the case where all the coefficients in the polynomial p·r×g+f×m whose coefficients possibly indicate negative values respectively indicates a value ranged from "−q/2" to "q/2", the value resulted from the polynomial p·r×g+f×m (mod q*) equals to the value resulted from the polynomial p·r×g+f×m, and thus, the value resulted from the polynomial a can be derived as indicated below.

$$a = p \cdot r \times g + f \times m(\bmod q^*)$$
$$= p \cdot r \times g + f \times m.$$

As described in Non-Patent Literature 2, this enables a proper decryption of the plain text m in the decryption performed thereafter, so that no decryption failures occur.

(ii) In the Case of NTRUEncrypt Scheme

In contrast, the NTRUEncrypt scheme does not disclose a condition for preventing the occurrence of decryption failure, however, in the case where all the coefficients in the polynomial p·r×g+f×m respectively indicates a value ranged from "0" to "(q−1)", it is possible to perform proper decryption so that no decryption failures occur. The reasons are indicated below.

As described in Non-Patent Literature 4, according to a decryption algorithm D, a polynomial a is calculated with respect to an encrypted text c by the expression $$a = c \times f(\bmod q),$$

using a polynomial f being a part of the private key. This operation derives a polynomial resulted from the multiplication between a polynomial c and the polynomial f, and obtains, as the polynomial a, a polynomial to which the mod q operation is performed so that each of the coefficients in the resulted polynomial indicates a value ranged from "0" to "(q−1)".

In this case, the value resulted from the polynomial a can be obtained by the following expression, based on the relational expression between a plain text m and the encrypted text c as well as the relational expression between the polynomial f being a part of the private key, and a public key h, as is described in Non-Patent Literature 4.

$$a = c \times f(\bmod q)$$
$$= p \cdot r \times g + f \times m(\bmod q).$$

That is to say, the polynomial a is a polynomial to which the mod q operation is performed so that each of the coefficients indicates a value ranged from "0" to "(q−1)".

In the NTRUEncrypt scheme, the random number polynomial r, the polynomials f and g, and the plain text polynomial m are polynomials whose coefficients respectively indicate 0 or 1. Therefore, the polynomial p·r×g+f×m is a polynomial whose coefficients respectively indicate 0 or a positive value.

In the case where all the coefficients in the polynomial p·r×g+f×m respectively indicate a value ranged from "0" to "(q−1)", the value resulted from the polynomial p·r×g+f×m (mod q) equals to the value resulted from the polynomial p·r×g+f×m, so that the value resulted from the polynomial a can be obtained by the following expression.

$$a = p \cdot r \times g + f \times m \pmod{q}$$
$$= p \cdot r \times g + f \times m.$$

Then, as is the case of the NTRU cryptosystem described in Non-Patent Literature 2, it is possible to properly decrypt the plain text m in the decryption to be performed thereafter, so that no decryption failures occur.

(Reason why a decryption failure does not occur with the use of parameters which satisfy a conditional expression EFC1)

The second variation NTRU cryptosystem is established by modifying the conventional NTRUEncrypt scheme so that the parameters which satisfy the conditional expression EFC1 are set, and no decryption failures occur in principle.

The following describes that, by setting the parameters in such a way that the conditional expression EFC1 is satisfied, all the coefficients in the polynomial p·r×g+f×m respectively indicate a value ranged from "0" to "(q−1)" and a decryption failure no longer occurs.

First, a polynomial p·r×g is to be considered.

Here, when a coefficient of k-th degree in the polynomial a is expressed by a(k), a coefficient of k-th degree in the polynomial r×g is expressed by $$(r \times g)(k) = r(0) \cdot g(k) + r(1) \cdot g(k-1) + \ldots +$$
$$r(N-1) \cdot g(k-(N-1)(\bmod N))$$

(e.g. see Non-Patent Literature 2 for a method of multiplying polynomials).

As has been described above, a random number r is a polynomial whose d coefficients indicate 1 and the other coefficients indicate 0, while a polynomial g is a polynomial whose dg coefficients indicate 1 and the other coefficients indicate 0.

It follows that the value of the coefficient (r×g)(k) in the polynomial r×g can be expressed by a term representing df number of 1·g(in) ($1 \leq n \leq d$), as indicated below.

$$r \times g(k) = r(0) \cdot g(k) + r(1) \cdot g(k-1) + \ldots +$$
$$r(N-1) \cdot g(k-(N-1)(\bmod N))$$
$$= 1 \cdot g(i1) + 1 \cdot g(i2) + \ldots + 1 \cdot (id) +$$
$$0 \cdot g(j1) + 0 \cdot g(j2) + \ldots + 0 \cdot g(j(N-d))$$
$$= 1 \cdot g(i1) + 1 \cdot g(i2) + \ldots + 1 \cdot g(id).$$

In the case where $d \leq dg$, it is conceivable that all the terms g(in) indicate 1 ($1 \leq n \leq d \leq dg$). In such case, the coefficient (r×g)(k) obtains the largest value and the value is d at the highest.

Note that in the case where d>dg, it is not possible to consider the case where all the terms g(in) indicate 1, so that in the case where df coefficients indicate 1 and (d−dg) coefficients indicate 0, the coefficient (r×g)(k) obtains the largest value and the value is dg at the highest.

Thus, the largest value of a coefficient in the polynomial r×g is Min(dg, d).

Therefore, the largest value of a coefficient in the polynomial r×g is Min(dg, d).

The polynomial f×m is considered next.

Considering here the coefficient of k-th degree in the polynomial f×m, the polynomial f is a polynomial whose df coefficients indicate 1 and the other coefficients indicate 0. The same argument as described above applies here, and the coefficient of k-th degree in the polynomial f×m is expressed by a term representing df numbers of 1·m(in) ($1 \leq n \leq df$), as indicated below.

$$f \times m(k) = f(0) \cdot m(k) + f(1) \cdot m(k-1) + \ldots +$$
$$f(N-1) \cdot m(k-(N-1)(\bmod N))$$
$$= 1 \cdot m(i1) + 1 \cdot m(i2) + \ldots + i \cdot m(idf).$$

Since the coefficients in the plain text polynomial m indicate 0 or 1, it is conceivable that all the coefficients m(in) indicate 1 ($1 \leq n \leq df$). In such case, (f×m)(k) indicates the largest value and the value is df at the highest.

As described above, the largest value of a coefficient in the polynomial f×m indicates df.

Summing up what is described above, the largest value of a coefficient in the polynomial p·r×g+f×m is p·Min(dg, d)+df at the highest.

When the largest value of the coefficient indicates q−1 or lower, it follows that all the coefficients in the polynomial p·r×g+f×m respectively indicate a value ranged from "0" to "(q−1)" so that no decryption failures occur.

In other words, in order to prevent the occurrence of decryption failure in principle, the expression $$p \cdot \mathrm{Min}(dg, d) + df < q,$$

has to be satisfied, which leads to the following conditional expression EFC1.

$$p \cdot \mathrm{Min}(dg, d) + df < q \qquad \text{EFC1}$$

<Method for Generating Parameters According to the Second Variation NTRU Cryptosystem>

Here is an example of the method for generating parameters according to the second variation NTRU cryptosystem.

As has been described above, the parameters which satisfy the above conditional expression EFC1 shall be generated as the parameters of the second variation NTRU cryptosystem.

For this, firstly p=2 is defined and then q=239 is defined so that p and q are relatively prime.

Then, defining df=dg=d, the values of df, dg and d are generated so as to satisfy the conditional expression EFC1. The value N is then generated so that the values indicating security against the round-robin attack and the LLL attack indicate predetermined values or greater.

Note that the above case is an example of the parameter generation method, and another method may be used as long as the parameters are generated so as to satisfy the conditional expression EFC1.

The case of using the parameters as represented by (N, p, q, df, dg, d)=(251, 2, 239, 63, 63, 63) which are generated based on the above method will be described thereinafter.

The second variation NTRU cryptosystem is described so far, and now a description of the encrypted communication system, encryption device and decryption device according to the present embodiment follows hereinafter.

<Outline of Encrypted Communication System 1b>

Figure 7:
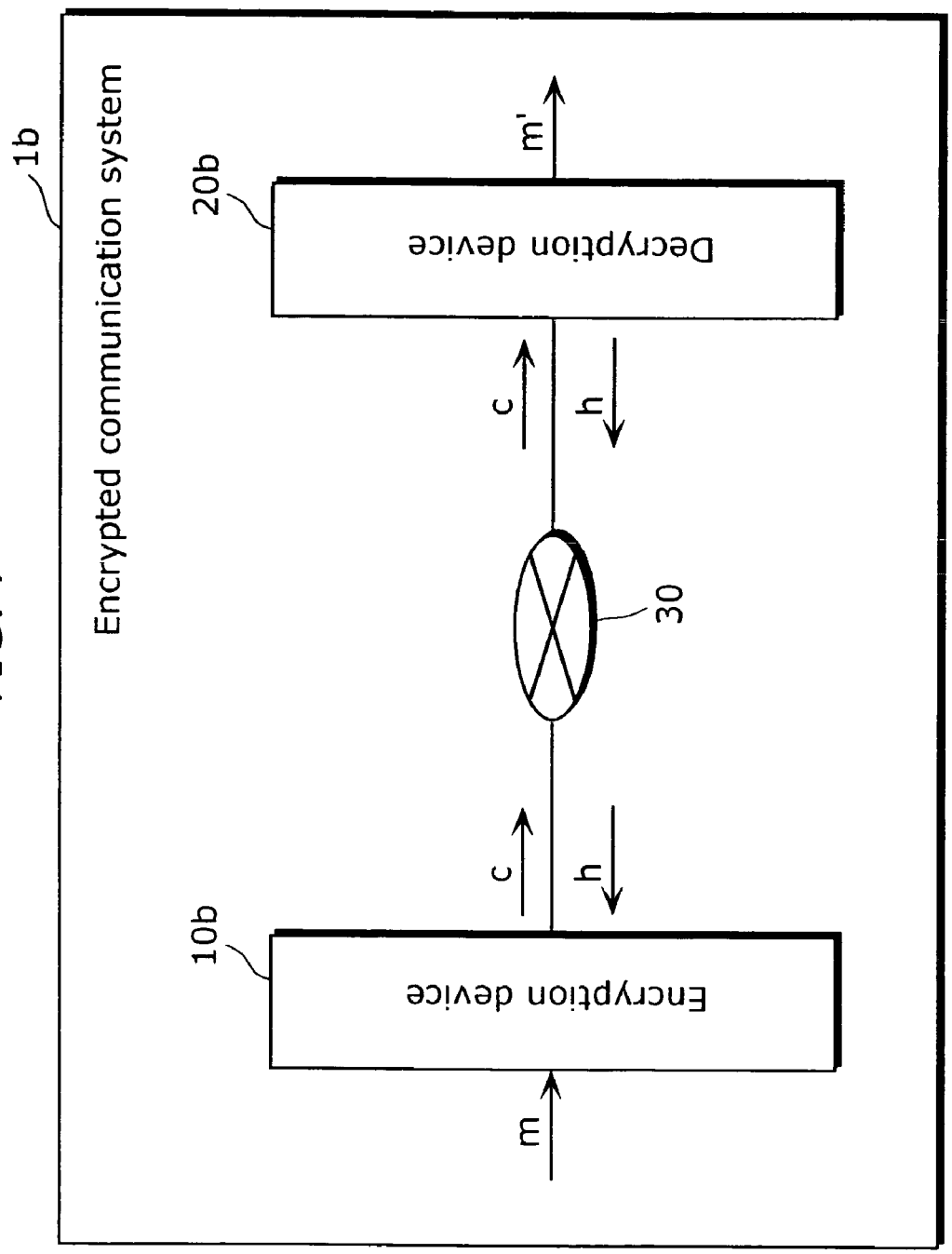
FIG. 7 is a block diagram showing a configuration of the encrypted communication system according to a second embodiment of the present invention.

FIG. 7 is a diagram showing an overall configuration of the encrypted communication system 1b according to the second embodiment of the present invention. First, an outline of the encrypted communication system 1b will be described with reference to the diagram.

The encrypted communication system 1b is a system for performing encrypted communication of a plain text m, and consists of an encryption device 10b and a decryption device 20b, where the encryption device 10b and the decryption device 20b are mutually connected via a communication path 30.

In the encrypted communication system 1b, the encryption device 10b and the decryption device 20b share the parameters of the second variation NTRU cryptosystem, (N, p, q, df, dg, d)=(251, 2, 239, 63, 63, 63).

In the encrypted communication system 1b, the encryption device 10b encrypts a plain text m inputted from outside, using the second variation NTRU cryptosystem as described above, so as to generate an encrypted text c, and transmits it to the decryption device 20b via the communication path 30.

The decryption device 20b decrypts the encrypted text c received from the encryption device 10b via the communication path 30, so as to generate a decrypted text m', and then outputs it.

Thus, the encrypted communication 1b is briefly described. The following describes structure and operation of the encrypted communication system 1b, focusing on the difference between the present encrypted communication system 1b and the encrypted communication system 1.

<Structure of Encrypted Communication System 1b>

As shown in FIG. 7, the encrypted communication system 1b is configured by the encryption device 10b and the decryption device 20b, and the encryption device 10b and the decryption device 20b are mutually connected via the communication path 30.

The following describes such components, focusing on the difference between the present encrypted communication system 1b and the encrypted communication system 1.

<Structure of Encryption Device 10b>

Figure 8:
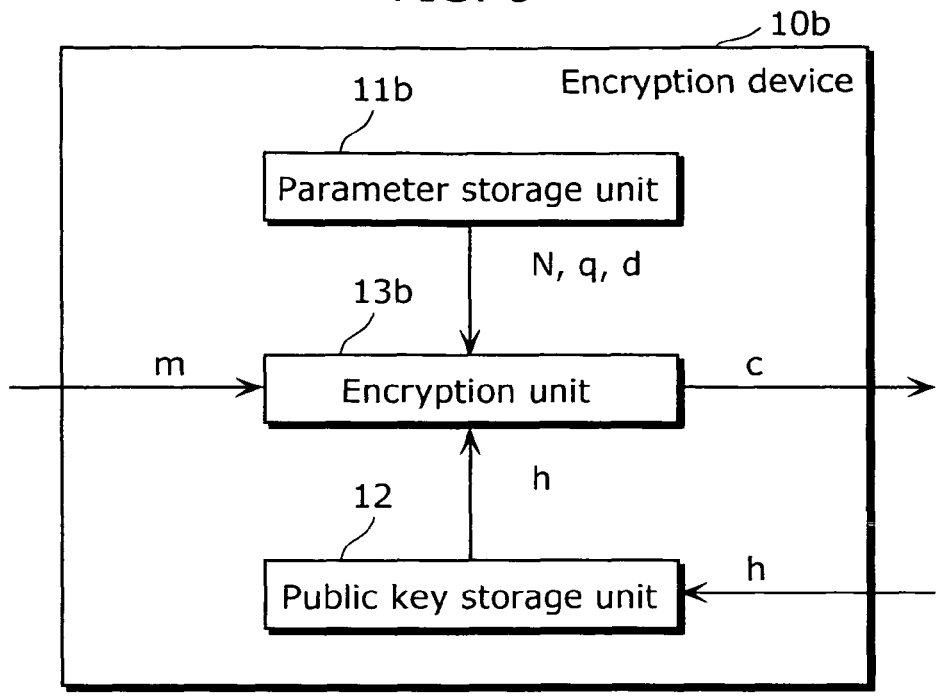
FIG. 8 is a block diagram showing a structure of the encryption device according to the second embodiment.

As shown in FIG. 8, the encryption device 10b consists of a parameter storage unit 11b, a public key storage unit 12, and an encryption unit 13b.

The following describes in detail the components, focusing on the difference between the encryption device 10b and the encryption device 10.

(1) Parameter Storage Unit 11b

The parameter storage unit 11b is structured by a memory such as a RAM and an EEPROM, and can be accessed by the encryption unit 13b to be mentioned later.

The parameter storage unit 11b previously stores parameters which satisfy the conditional expression EFC1. As described above, the parameter storage unit 11b previously stores the parameters (N, p, q, df, dg, d)=(251, 2, 239, 63, 63, 63).

(2) Encryption Unit 13b

The encryption unit 13b is structured, for example, by a micro computer, and can access the parameter storage unit 11b and the public key storage unit 12.

The encryption unit 13b differs from the encryption unit 13 in that it performs encryption based on the second variation NTRU cryptosystem instead of the first variation NTRU cryptosystem so as to generate an encrypted text c.

<Structure of Decryption Device 20b>

Figure 9:
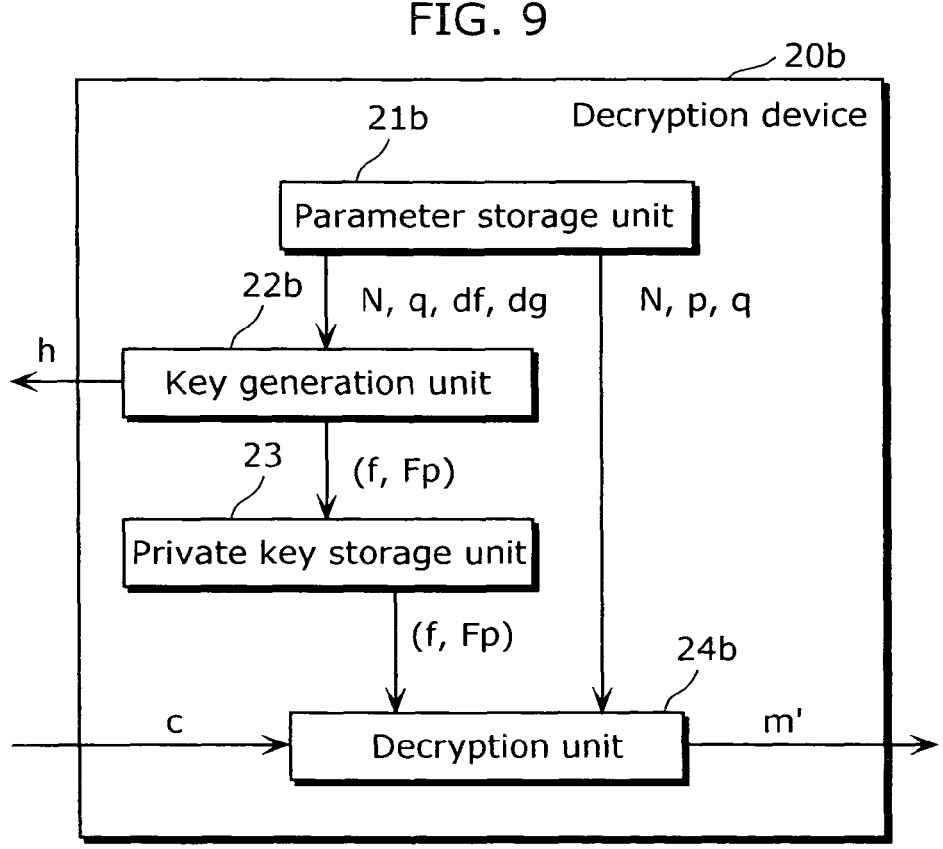
FIG. 9 is a block diagram showing a structure of the decryption device according to the second embodiment.

As shown in FIG. 9, the decryption device 20b is configured by a parameter storage unit 21b, a key generation unit 22b, a private key storage unit 23 and a decryption unit 24b.

The following describes the components, focusing on the difference between the decryption device 20b and the decryption device 20.

(1) Parameter Storage Unit 21b

The parameter storage unit 21b is structured by a memory such as a RAM and an EEPROM, and can be accessed by the key generation unit 22b and the decryption unit 24b.

The parameter storage unit 21b previously stores the same parameters (N, p, q, df, dg, d) as those stored in the parameter storage unit 11b of the encryption device 10b. As described above, the parameter storage unit 21b stores in advance the parameters (N, p, q, df, dg, d)=(251, 2, 239, 63, 63, 63).

(2) Key Generation Unit 22b

The key generation unit 22b is structured by a micro computer, for instance, and generates a private key f, and a public key h of an error-free NTRU cryptosystem.

The key generation unit 22b differs from the key generation unit 22 in that it performs key generation based on the second variation NTRU cryptosystem instead of the first variation NTRU cryptosystem.

(3) Decryption Unit 24b

The decryption unit 24b is structured by a micro computer, for example, and can access to the parameter storage unit 21b and the private key storage unit 23.

The decryption unit 24b differs from the decryption unit 24 in that it performs decryption based on the second variation NTRU cryptosystem instead of the first variation NTRU cryptosystem, so as to generate a decrypted text m'.

<Operation of Encrypted Communication 1b>

Figure 10:
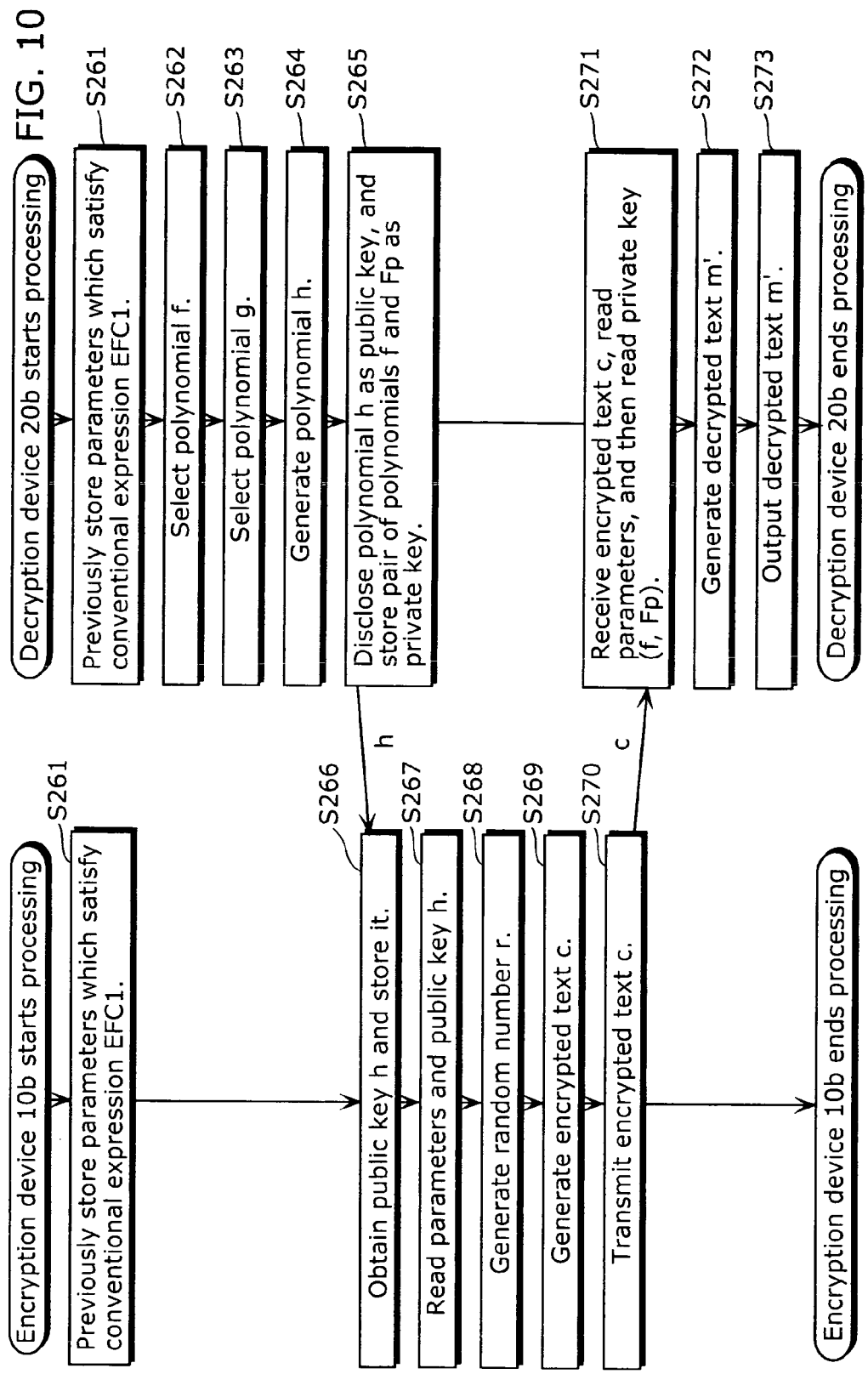
FIG. 10 is a flowchart showing an overall operation of the encrypted communication system according to the second embodiment.

Thus, the structure of the encrypted communication system 1b has been described above. Now, the overall operation of the encrypted communication system 1b will be described with reference to a flowchart shown in FIG. 10.

First, the parameter storage units 11b and 21b previously store the parameters that satisfy the conditional expression EFC1 (Step S261).

Next, the key generation unit 22b reads the parameters N, q, df and dg from the parameter storage unit 21b, and selects the polynomial f expressed by a polynomial of degree (N−1) or lower using the parameters N and df, so that df coefficients indicate 1 and the other coefficients indicate 0 (Step S262).

The key generation unit 22b then selects the polynomial g expressed by a polynomial of degree (N−1) or lower, using the parameters N and dg, so that dg coefficients indicate 1 and the other coefficients indicate 0 (Step S263).

The key generation unit 22b then performs the key generation according to the second variation NTRU cryptosystem, and generates polynomials Fp and h (Step S264).

The key generation unit 22b then discloses the polynomial h as a public key so that the encryption device 10b can obtain it, and stores (f, Fp) that is a pair of the polynomials f and Fp into the private key storage unit 23, as a private key (Step S265).

The public key storage unit 12 obtains the public key h of the decryption device 20b via the communication path 30, and stores it (Step S266).

Then, when the plain text m whose coefficients indicate 0 or 1 is inputted from outside, the encryption unit 13b reads the parameters N, q and d from the parameter storage unit 11b, and reads the public key h from the public key storage unit 12 (Step S267).

The encryption unit 13b then randomly selects the polynomial r of degree (N−1) or lower using the parameters N and d, so that d coefficients indicate 1 and the other coefficients indicate 0 (Step S268).

The encryption unit 13b then encrypts the plain text m using a random number r, the public key h, the parameters N and q based on the second variation NTRU cryptosystem, and generates an encrypted text c (Step S269).

Then, the encryption unit 13b transmits the generated encrypted text c to the decryption device 20b via the communication path 30. (Step S270).

When receiving the encrypted text c from the encryption device 10b via the communication path 30, the decryption unit 24b reads the parameters N, p and q from the parameter storage unit 21b, and then reads the private key (f, Fp) from the private key storage unit 23 (Step S271).

Then, the decryption unit 24b encrypts the encrypted text c using the polynomials f and Fp being private key, the parameters N, p and q, based on the second variation NTRU cryptosystem, and generates a decrypted text m' (Step S272).

Then, the decryption unit 24b outputs the generated decrypted text m' outside and terminates the processing (Step S273).

<Verification of Operation of Encrypted Communication System 1b>

First, in Step S261, the encryption device 10b and the decryption device 20b store the parameters that satisfy the conditional expression EFC1.

The decryption device 20b previously generates, in Steps 262 and 263, polynomials f and g whose coefficients indicate either of two values 0 and 1, using the parameters, and generates a public key polynomial h, based on these polynomials.

Then, the encryption device 10b generates, in Step S267, a polynomial r whose coefficients indicate either of two values 0 and 1, and encrypts, in Step S268, a plain text m whose coefficients indicate either of two values 0 and 1, using the parameters that satisfy the conditional expression EFC1, as well as the public key h and the random number r, so as to generate an encrypted text c.

The decryption device 20b generates, in Step S271, a decrypted text m' using the parameters which satisfy the conditional expression EFC1 and are stored together with the private key polynomials f and Fp.

According to such structure, the encryption device 10b and the decryption device 20b share the parameters which satisfy the conditional expression EFC1, and perform encrypted communication using such parameters. Therefore, no decryption failures occur in principle as the decrypted text m' is always the same as the plain text m, as is already stated in the decryption of the conditional expression EFC1.

Thus, it is possible to configure the second variation NTRU cryptosystem which prevents, in principle, the occurrence of decryption failure. Also, the application of the second variation NTRU cryptosystem allows a provision of the encrypted communication system under which the data transmitted by an encryption device can be always decrypted properly by a decryption device.

<Variation>

The embodiment described above is an example of the embodiment according to the present invention, and the present invention shall not be limited to such embodiment, but can be embodied in various modes within the scope of the subject matter. The case indicated below is also included in the scope of the present invention.

(1) In the encrypted communication 1b, the parameters which satisfy the condition p=2 are used as the parameters of the second variation NTRU cryptosystem, however, other parameters may be used as long as the conditional expression EFC1 is satisfied, e.g., parameters that satisfy p=3. The above embodiment describes that the parameters (N, p, q, df, dg, d)=(251, 2, 239, 63, 63, 63) are used as the parameters that satisfy the conditional expression EFC1, however, the parameters (N, p, q, df, dg, d)=(251, 2, 239, 72, 72, 72) applied in the NTRUEncrypt scheme may be used instead since they satisfy the conventional expression EFC1.

(2) In the encrypted communication system 1b, a polynomial of degree (N−1) or lower whose df coefficients indicate 1 and the other coefficients indicate 0 is selected for a polynomial f which is a part of the private key applied in the second variation NTRU cryptosystem. However, a private key f may be selected by f=1+p·F, using the polynomial F of degree (N−1) or lower whose df coefficients indicate 1 and the other coefficients indicate 0, as is the case of the NTRUEncrypt scheme, so that the parameters which satisfy a conditional expression EFC2 to be mentioned later. In such case, a private key may be expressed as a polynomial f instead of (f, Fp).

Thus, the polynomial multiplication performed with the polynomial Fp in the decryption according to the NTRU cryptosystem becomes unnecessary, as is the case of the NTRUEncrypt scheme. Note that the parameters which satisfy the conditional expression EFC2 are generated, as will be mentioned later, therefore, a decryption failure does not occur in principle, and it is thus possible to realize the encrypted communication system in which a decryption device can always properly decrypt the data transmitted by an encryption device, as described in the second embodiment.

Third Embodiment

The encrypted communication system, encryption device and decryption device according to the third embodiment, improves the NTRUEncrypt scheme so as to newly configure an NTRU cryptosystem which does not, in principle, let a decryption failure occur and is capable of high speed processing, and to perform encrypted communication using such newly-configured NTRU cryptosystem, and encrypted communication is performed using such newly-built NTRU cryptosystem (hereinafter such newly-established NTRU cryptosystem which principally prevents the occurrence of decryption failure is referred to as "third variation NTRU cryptosystem").

The third variation NTRU cryptosystem will be firstly described.

The following focuses on the difference between the third variation NTRU cryptosystem and the conventional NTRUEncrypt scheme.

<Third Variation NTRU Cryptosystem>

The third variation NTRU cryptosystem is generated by modifying the conventional NTRUEncrypt scheme so as to prevent, in principle, the occurrence of decryption failure as well as to enable high-speed processing.

The third variation NTRU cryptosystem differs from the conventional NTRUEncrypt scheme in that it selects, for the polynomials f, g, the random number polynomial r and the plain text polynomial m, a polynomial whose coefficients indicate either of two values 0 and 1, using the parameters which satisfy $p=3$, $q=2^k$ (k: an integer of 2 or greater), and that it generates parameters which satisfy the conditional expression EFC2 to be mentioned later.

The following describes the third variation NTRU cryptosystem.

(1) Parameters of Third Variation NTRU Cryptosystem

The third variation NTRU cryptosystem has non-negative integer parameters N, p, q, df, dg and d. The meanings of these parameters is as same as those applied in the conventional NTRUEncrypt scheme, however, the difference between the third variation NTRU cryptosystem and the conventional NTRUEncrypt scheme lies in that it generates the parameters which satisfy $p=3$ and $q=2^k$ (k: an integer of 2 or greater), and uses a polynomial whose coefficients indicate either of two values 0 and 1 for the polynomials f, g and the random number polynomial r even though p=3 is defined, and that it selects the parameters p, q, df, dg and d which satisfy the following conditional expression EFC2.

$$\text{Min}(dg, d)+df<(q-1)/p \qquad \text{EFC2}$$

Thus, by using the polynomial whose coefficients indicate either of two values 0 and 1 for the polynomials f, g and the random number polynomial r in spite of the use of the parameters which satisfy p=3, it is possible to perform processing with the speed higher than that applied in the conventional NTRUEncrypt scheme.

The use of the parameters which satisfy the above conventional expression EFC2 can prevent, in principle, the occurrence of decryption failure, as will be referred to later on.

(2) Key Generation in Third Variation NTRU Cryptosystem

As described above, in the third variation NTRU cryptosystem, the polynomials f and g are generated at random using the parameters df and dg. The polynomial f is selected based on the expression f=1+p·F, using a polynomial F of degree (N−1) or lower whose df coefficients indicate 1 and the other coefficients indicate 0.

A polynomial h is generated by the expression $$h=Fq \times g \pmod{q}$$

using the polynomial Fq which satisfies Fq×f=1(mod q), as described in Non-Patent Literature 2. Here, a private key is presented by the polynomial f and a public key is presented by the polynomial h.

(3) Encryption in Third Variation NTRU Cryptosystem

In the encryption performed in the third variation NTRU cryptosystem, a plain text polynomial m and whose coefficients indicate either of two values 0 and 1 is encrypted, so that an encrypted text polynomial c is calculated. First, the polynomial r as described above is generated randomly. In other words, a random number r is a polynomial of degree (N−1) or lower, having N coefficients from coefficients of degree 0 (constant term) to degree (N−1). The polynomial r is randomly selected so that d coefficients indicate 1, d coefficients indicate −1 and (N−2d) coefficients indicate 0 among N coefficients.

Then, an encrypted text c is generated for the plain text m of degree (N−1) or lower whose coefficients indicate 0, 1 or −1 by the expression $$c=p \cdot r \times h+m \pmod{q},$$

using the random number r and the public key h.

(4) Decryption in Third Variation NTRU Cryptosystem

As will be mentioned later, a decryption failure does not occur in principle in the third variation NTRU cryptosystem, so that processing of reducing decryption failure probability is unnecessary, unlike the NTRUEncrypt scheme.

The decryption is therefore performed as follows.

In the decryption performed in the third variation NTRU cryptosystem, the encrypted text polynomial c is decrypted, and a decrypted text polynomial m' is calculated. At the time of the decryption, a polynomial a is firstly calculated for the encrypted text c, by the expression $$a=f \times c \pmod{q^*},$$

using the polynomial f which is a part of the private key.

Next, a polynomial b is generated for the polynomial a by the expression $$b=a \pmod{p},$$

using the parameter p.

As is described in Non-Patent Literature 4, the private key polynomial f which is a is expressed by f=1+p·F, so that the polynomial Fp which satisfies Fp×f=1(mod p) is expressed by Fp=1(mod p). This does not require a polynomial multiplication with the polynomial Fp to be performed in the decryption, therefore, the decrypted text m' is generated by the expression $$m'=a \pmod{p^*}.$$

Thus, in the third variation NTRU cryptosystem, unlike the conventional NTRUEncrypt scheme, no processing is performed in order to reduce decryption failure probability, as can be seen in an algorithm called "center1" or "center2" according to Non-Patent Literature 4.

<Reasons why a Decryption Failure does not Occur in Principle>

The following describes that a decryption failure does not occur in principle in the third variation NTRU cryptosystem which uses the parameters that satisfy the conditional expression EFC2 described above.

(Reasons why Use of Parameters that Satisfy the Conditional Expression EFC2 Prevents the Occurrence of Decryption Failure)

The third variation NTRU cryptosystem is established by modifying the conventional NTRUEncrypt scheme in order that the parameters are set so that the conditional expression EFC2, so that a decryption failure does not occur in principle.

The following describes that by setting the parameters in such a manner that the conditional expression EFC2 is satisfied, decryption failure no longer occur since all the coefficients in the polynomial p·r×g+f×m respectively indicate a value ranged from "0" to "(q−1)".

First, considering the case of the polynomial p·r×g, the largest value of the coefficient in the polynomial p·r×g is expressed by p·Min(dg, d), as is described above.

Next, the case of the polynomial f×m is considered.

Now, the private key polynomial f being expressed by f=1+p·F, the polynomial f×m is expressed as follows.

$$f \times m = (1+p \cdot F) \times m$$
$$= m + p \cdot F \times m.$$

Here the coefficient of k-th degree in the polynomial F×m is considered. The polynomial F is a polynomial whose df coefficients indicate 1 and the other coefficients indicate 0, therefore, the same argument as described above applies here, and the coefficient of k-th degree in the polynomial F×m is expressed by a term 1·m(in) in df numbers (1≦n≦df).

$$F \times m(k) = F(0) \cdot m(k) + F(1)m(k-1) + \ldots +$$
$$F(N-1) \cdot m(k-(N-1)(\text{mod} N))$$
$$= 1 \cdot m(i1) + 1 \cdot m(i2) + \ldots + i \cdot m(idf).$$

Since the coefficients in the plain text polynomial m indicate 0 or 1, the case where all the coefficients m(in) indicate 1 is conceivable (1≦n≦df), where (F×m)(k) indicates the largest value and the value is df at the highest.

As described above, the largest value of the coefficient in the polynomial F×m indicates df.

Accordingly, the largest value of the coefficient in the plain text polynomial m indicates 1 and the largest value of the coefficient in the polynomial p·F×m indicates p·F×m, therefore, the largest value of the coefficient in the polynomial f×m(=m+p·F×m) is 1+p·df.

Summing up the above, the largest value of the coefficient in the polynomial p·r×g+f×m is p·Min(dg, d)+1+p·df at the highest.

When the largest value of the coefficient indicates q−1 or lower, it follows that all the coefficients in the polynomial p·r×g+f×m respectively indicate a value ranged from "0" to "(q−1)", therefore, no decryption failures occur.

In other words, in order to prevent the occurrence of decryption failure in principle, the expression $$p \cdot \text{Min}(dg, d) + 1 + p \cdot df < q,$$

has to be satisfied, and the following conditional expression EFC2 is derived by modifying this expression.

$$\text{Min}(dg, d) + df < (q-1)/p \qquad \text{EFC2}$$

<Method for Generating Parameters According to the Third Variation NTRU Cryptosystem>

Here is an example of the method for generating parameters according to the third variation NTRU cryptosystem.

As has been described above, the parameters used in the third variation NTRU cryptosystem shall satisfy p=3 and q=2^k (k: an integer of 2 or greater) so that the parameters which satisfy the above conditional expression EFC2 are generated.

For this, firstly p=3 is defined, and then q=256 is defined so that p and q are relatively prime and the mod q operation of the coefficients can be realized by operations which derive only the lowest 8 bits in the bit mask operation.

Then, defining df=dg=d, the values of df, dg and d are generated so as to satisfy the conditional expression EFC2. The value N is then generated so that the values indicative of security against the round-robin attack and the LLL attack indicate predetermined values or greater.

Note that the above case is an example of the parameter generation method, and another method may be used as long as the parameters are generated so as to satisfy the conditional expression EFC2.

The case of using the parameters presented by (N, p, q, df, dg, d)=(251, 3, 256, 42, 42, 42) which are generated based on the above method will be described thereinafter.

The third variation NTRU cryptosystem has been described so far, and now the encrypted communication system, encryption device and decryption device according to the present embodiment follows hereinafter.

<Outline of Encrypted Communication System 1c>

Figure 11:
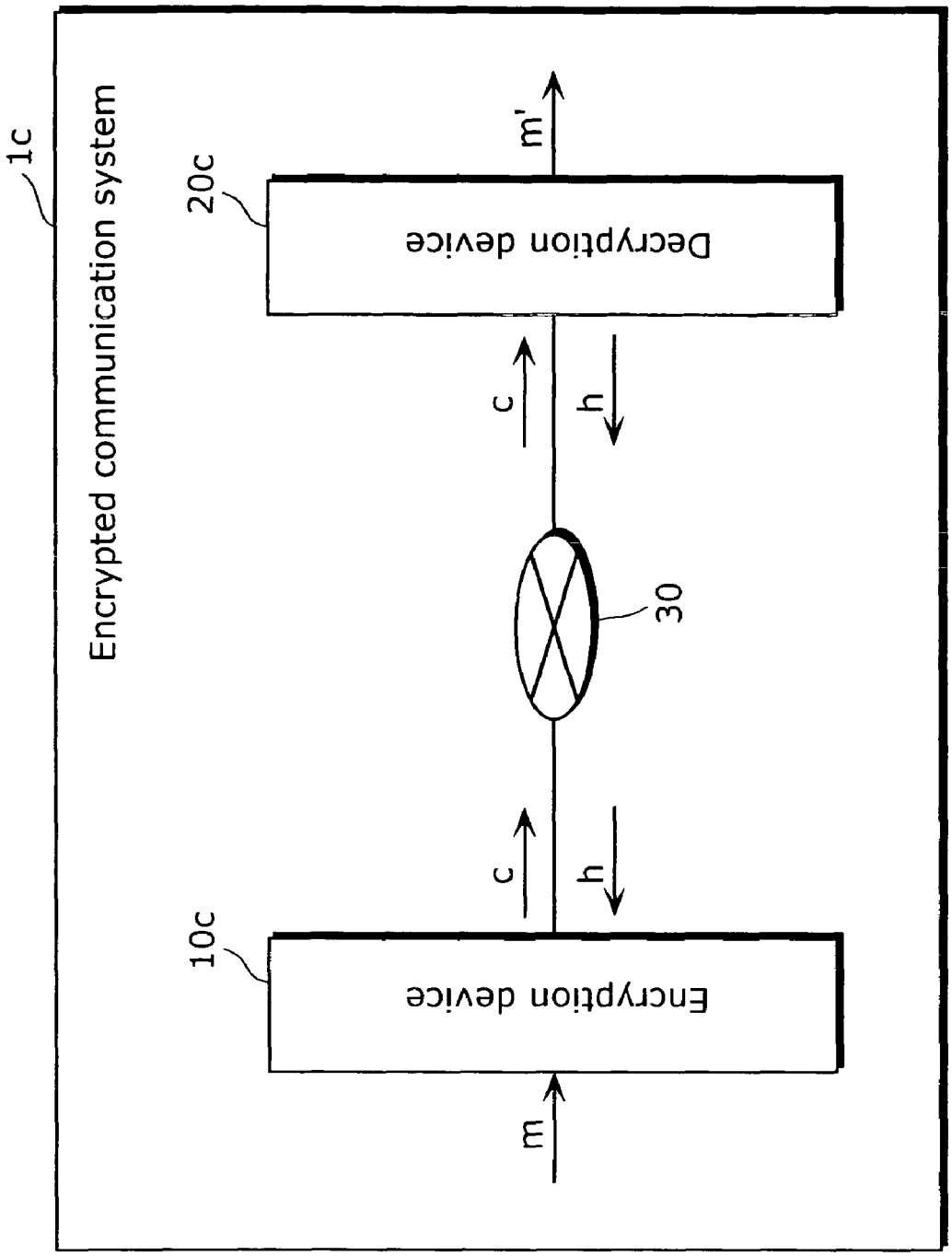
FIG. 11 is a block diagram showing a configuration of the encrypted communication system according to a third embodiment.

FIG. 11 is a diagram showing an overall configuration of the encrypted communication system 1c according to the third embodiment of the present invention. First, an outline of the encrypted communication system 1c will be described with reference to the diagram.

The encrypted communication system 1c is a system for performing encrypted communication of a plain text m, and consists of an encryption device 10c and a decryption device 20c, where the encryption device 10c and the decryption device 20c are mutually connected via a communication path 30.

In the encrypted communication system 1c, the encryption device 10c and the decryption device 20c share the parameters of the third variation NTRU cryptosystem, (N, p, q, df, dg, d)=(251, 3, 256, 42, 42, 42).

In the encrypted communication system 1c, the encryption device 10c encrypts a plain text m inputted from outside, using the third variation NTRU cryptosystem as described above, so as to generate an encrypted text c, and transmits it to the decryption device 20c via the communication path 30.

The decryption device 20c decrypts the encrypted text c received from the encryption device 10c via the communication path 30, so as to generate a decrypted text m', and then outputs it.

Thus, the encrypted communication 1c is briefly described. The following describes structure and operation of the encrypted communication system 1c, focusing on the difference between the present encrypted communication system 1c and the encrypted communication system 1.

<Structure of Encrypted Communication System 1c>

As shown in FIG. 11, the encrypted communication system 1c is configured by the encryption device 10c and the decryption device 20c, and the encryption device 10c and the decryption device 20c are mutually connected via the communication path 30.

The following describes such components, focusing on the difference between the present encrypted communication system 1c and the encrypted communication system 1.

<Structure of Encrypted Communication System 1c>

Figure 12:
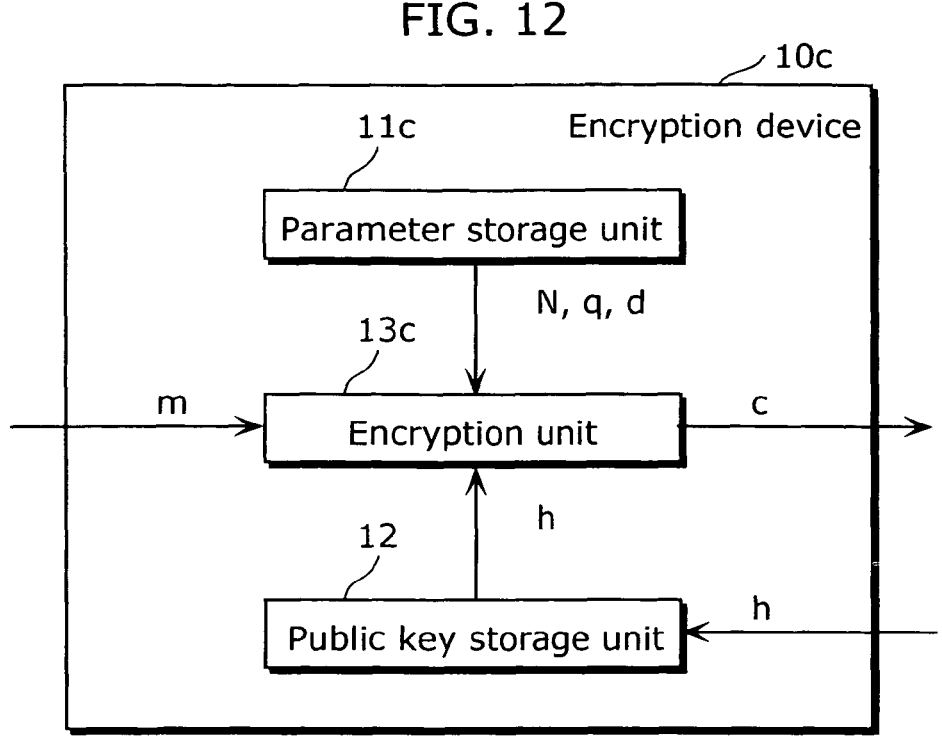
FIG. 12 is a block diagram showing a structure of the encryption device according to the third embodiment.

As shown in FIG. 12, the encryption device 10c consists of a parameter storage unit 11c, a public key storage unit 12, and an encryption unit 13c.

The following describes the components, focusing on the difference between the encryption device 10c and the encryption device 10.

(1) Parameter Storage Unit 11c

The parameter storage unit 11c is structured by a memory such as a RAM and an EEPROM, and can be accessed by the encryption unit 13c to be mentioned later.

The parameter storage unit 11c previously stores parameters which satisfy p=3 and q=2^k (k: an integer of 2 or greater) as well as the conditional expression EFC2. As described above, the parameter storage unit 11c previously stores the parameters (N, p, q, df, dg, d)=(251, 3, 256, 42, 42, 42).

(2) Encryption Unit 13c

The encryption unit 13c is structured, for example, by a micro computer, and can access the parameter storage unit 11c and the public key storage unit 12.

The encryption unit 13c differs from the encryption unit 13 in that it performs encryption based on the third variation NTRU cryptosystem instead of the first variation NTRU cryptosystem so as to generate an encrypted text c.

<Structure of Decryption Device 20c>

Figure 13:
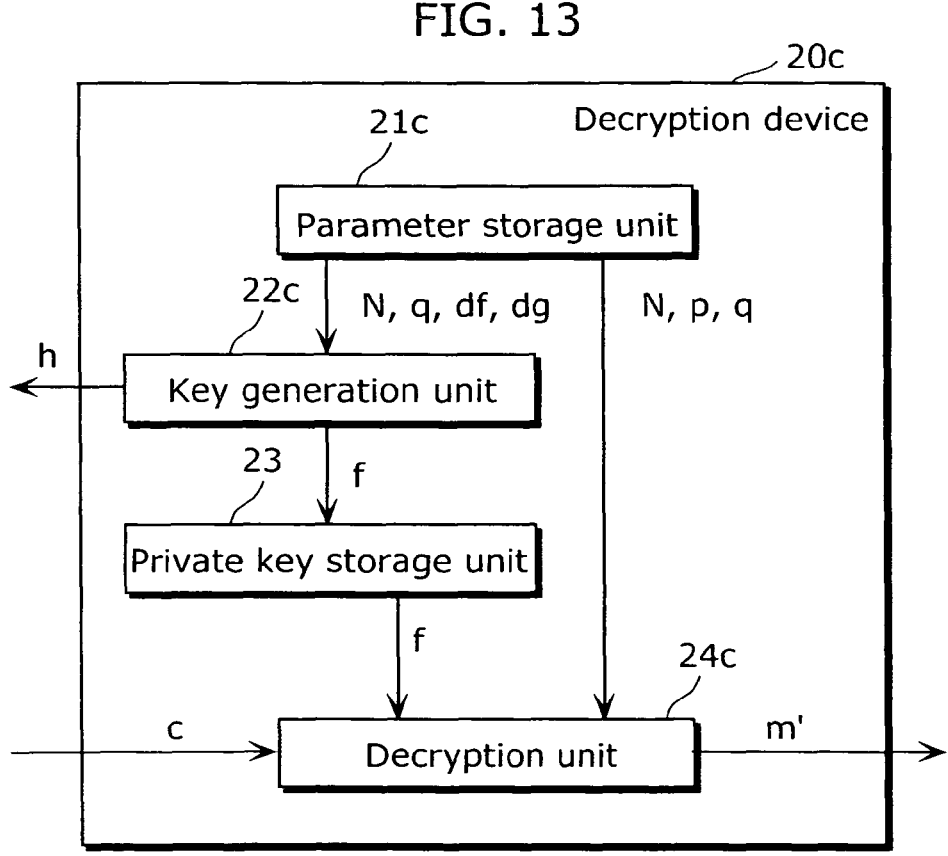
FIG. 13 is a block diagram showing a structure of the decryption device according to the third embodiment.

As shown in FIG. 13, the decryption device 20c is configured by a parameter storage unit 21c, a key generation unit 22c, a private key storage unit 23 and a decryption unit 24c.

The following describes the components, focusing on the difference between the decryption device 20c and the decryption device 20.

(1) Parameter Storage Unit 21c

The parameter storage unit 21c is structured by a memory such as a RAM and an EEPROM, and can be accessed by the key generation unit 22c and the decryption unit 24c.

The parameter storage unit 21c previously stores the same parameters (N, p, q, df, dg, d) as those stored in the parameter storage unit 11c of the encryption device 10c. As described above, the parameter storage unit 21c stores in advance the parameters (N, p, q, df, dg, d)=(251, 3, 256, 42, 42, 42).

(2) Key Generation Unit 22c

The key generation unit 22c is structured by a micro computer, for instance, and generates a private key polynomial f, and a public key polynomial h according to the third variation NTRU cryptosystem.

The key generation unit 22c differs from the key generation unit 22 in that it performs key generation based on the third variation NTRU cryptosystem instead of the first variation NTRU cryptosystem.

(3) Decryption Unit 24c

The decryption unit 24c is structured by a micro computer, for example, and can access to the parameter storage unit 21c and the private key storage unit 23.

The decryption unit 24c differs from the decryption unit 24 in that it performs decryption based on the third variation NTRU cryptosystem instead of the first variation NTRU cryptosystem, and generates a decrypted text m'.

<Operation of Encrypted Communication 1c>

Thus, the structure of the encrypted communication system 1c has been described above. Now, the overall operation of the encrypted communication system 1c will be described with reference to a flowchart shown in FIG. 14.

First, the parameter storage units 11c and 21c previously store the parameters that satisfy p=3 and q=2^k (k: an integer of 2 or greater) as well as the conditional expression EFC2 (Step S361).

Next, the key generation unit 22c reads the parameters N, q, df and dg from the parameter storage unit 21c, selects the polynomial F expressed by a polynomial of degree (N−1) or lower using the parameters N and df, so that df coefficients indicate 1 and the other coefficients indicate 0, and generates a private key f by the expression f=1+p·F (Step S362).

The key generation unit 22c then selects the polynomial g expressed by a polynomial of degree (N−1) or lower, using the parameters N and dg, so that dg coefficients indicate 1 and the other coefficients indicate 0 (Step S363).

The key generation unit 22c then performs the key generation according to the third variation NTRU cryptosystem, and generates a public key polynomial h (Step S364).

The key generation unit 22c then discloses the polynomial h as a public key so that the encryption device 10c can obtain it, and stores the polynomial f into the private key storage unit 23, as a private key (Step S365).

The public key storage unit 12 obtains the public key h of the decryption device 20c via the communication path 30, and stores it (Step S366).

Then, when the plain text m whose coefficients indicate 0 or 1 is inputted from outside, the encryption unit 13c reads the parameters N, q and d from the parameter storage unit 11c, and reads the public key h from the public key storage unit 12 (Step S367).

The encryption unit 13c then randomly selects the polynomial r of degree (N−1) or lower using the parameters N and d, so that d coefficients indicate 1 and the other coefficients indicate 0 (Step S368).

The encryption unit 13c then encrypts the plain text m using the random number r, the public key h, the parameters N and q based on the third variation NTRU cryptosystem, and generates an encrypted text c (Step S369).

Then, the encryption unit 13c transmits the generated encrypted text c to the decryption device 20c via the communication path 30 (Step S370).

When receiving the encrypted text c from the encryption device 10c via the communication path 30, the decryption unit 24c then reads the parameters N, p and q from the parameter storage unit 21c, and reads the private key f from the private key storage unit 23 (Step S371).

Then, the decryption unit 24c encrypts the encrypted text c using the private key f, the parameters N, p and q, based on the third variation NTRU cryptosystem, and generates a decrypted text m' (Step S372).

Then, the decryption unit 24c outputs the generated decrypted text m' outside, and terminates the processing (Step S373).

<Verification of Operation of Encrypted Communication System 1c>

First, in Step S361, the encryption device 10c and the decryption device 20c store the parameters that satisfy p=3 and q=2^k (k: an integer of 2 or greater) as well as the conditional expression EFC2.

Then, in Steps 362 and 363, the decryption device 20c previously generates the private key f and the polynomial g whose coefficients indicate either of two values 0 and 1, using the parameters, and in Step 364, generates the public key h based on these polynomials.

Then, the encryption device 10c generates, in Step S368, the polynomial r whose coefficients indicate either of two values 0 and 1, and encrypts, in Step S369, the plain text m whose coefficients indicate either of two values 0 and 1, using the parameters the public key h and the random number r, which satisfy p=3 and q=2^k (k: an integer of 2 or greater) and the conditional expression EFC2, so as to generate an encrypted text c.

The decryption device 20c generates, in Step S372, a decrypted text m' using the parameters which satisfy p=3 and q=2^k (k: an integer of 2 or greater) as well as the conditional expression EFC2, and which are stored together with the private key f.

According to such structure, the encryption device 10c and the decryption device 20c share the parameters which satisfy p=3 and q=2^k (k: an integer of 2 or greater) as well as the conditional expression EFC2, and perform encrypted communication using such parameters, it is possible to perform processing with the speed higher than that achieved in the conventional NTRUEncrypt scheme, as already described above. Therefore, no decryption failures occur in principle as the decrypted text m' is always the same as the plain text m, as is already stated in the description of the conditional expression EFC2.

Thus, it is possible to establish the third variation NTRU cryptosystem which prevents, in principle, the occurrence of decryption failure, and is capable of high-speed processing. Also, the application of the third variation NTRU cryptosystem allows the provision of the encrypted communication system under which the data transmitted by an encryption device can be always decrypted properly by a decryption device and processing is performed with the speed higher than that applied in the conventional system.

(Other Variations)

The embodiment described above is an example of the embodiment according to the present invention, and the present invention shall not be limited to such embodiment, but can be embodied in various modes within the scope of the subject matter. In addition to the variation described above, the case indicated below is also included in the scope of the present invention.

(1) The encrypted communication 1, 1b and 1c respectively present an example of parameter generation method and an example of the parameters generated based on the respective parameter generation methods. The present invention, however, is not limited to these examples, and other methods maybe used, or other parameters may be used as long as they satisfy the conditions.

(2) In the encrypted communication system 1, the encryption device 10 and the decryption device 20 share the same parameters (N, p, q, df, dg, d)=(251, 3, 256, 42, 42, 42), however, the encryption device 10 may hold only the parameters necessary for encryption among these parameters, and the decryption device 20 may hold only the parameters necessary for key generation and decryption.

(3) In the encrypted communication system 1, it is the decryption device 20 which performs key generation. However, the encrypted communication system 1 may include a key generation device which can communicate with the encryption device 10 and the decryption device 20 via a dedicated communication path. Thus, the key generation device, instead of the decryption device 20, performs key generation, the encryption device 10 obtains a public key h from the key generation device via the dedicated communication path and previously stores it in the public key storage unit 12, and the decryption device 20 obtains a polynomial f which is a part of the private key, or a private key per se and previously stores it into the private key storage unit 23. A communication path may be used instead of a dedicated communication path.

(4) According to the first through third embodiments, operations are expressed using polynomials, however, they may be expressed as an element of general ring R as described in Patent Reference 1. More precisely, polynomials may be used as an element of ring R whereas p and q may be used as ideals of the ring R. Moreover, p and q according to the first through third embodiments may be expressed by p=pg·R, q=qg·R. To be more concrete, in the case where p=3 and q=2^k, p and q may be expressed by p=3·R and q=(2^k)·R. In such case, 2 is 2 in terms of ring R and can be derived by adding an identity element 1 of multiplicative group to a zero element 0 of additive group for two times. Similarly, 3 is derived by adding an identity element 1 to a zero element 0 for three times. In addition, 2^k is derived as a result of an identity element 1, of a multiplicative group, multiplied k times by 2.

The condition for preventing the occurrence of decryption failure may be defined as pg×Min (dg, d)+1+pg×df<qg, where the parameters dg and d may indicate the number obtained for the case where a member indicates 1 when the elements g and r are expressed in terms of N-dimensional array, the parameter df may indicate the number obtained for the case where a member indicates 1 when f or F is expressed in terms of N-dimensional array.

(5) The present invention may be the method indicated above, or a computer program for realizing such method with a computer, or a digital signal embodied by the computer program.

The present invention may be the computer program or the digital signal stored into a computer-readable storage medium such as a semiconductor memory, a hard disk drive, a CD-ROM, a DVD-ROM, and a DVD-RAM.

(6) The respective embodiments and the respective variations may be combined.

(7) Each of the functional blocks shown in the block diagrams (FIGS. 2 and 4) are realized as an LSI which is typically an integrated circuit. Such functional blocks may be separately, or partly or entirely incorporated into a chip.

Note that an LSI may be also termed as an IC, a system LSI, a super LSI and an ultra LSI depending on the difference in the degree of integration.

The method of incorporating the functions into a chip is not limited to LSI and it may be realized by a dedicated circuit or a general-purpose processor. A Field Programmable Gate Array (FPGA) which can perform programming after the manufacturing of LSI, or a reconfigurable processor which can reconfigure connection and setting of the circuit cells within an LSI may be used.

Furthermore, with the arrival of the technique of the integration into a chip, replacing the LSI due to progress in semiconductor technology or another technique derived wherefrom, the functional blocks may be surely integrated using such technique. A biotechnology is a possibility for such technique.

The encrypted communication system, encryption device and decryption device according to the present invention are advantageous in that they can perform processing with the speed higher than the one conventionally achieved, or in that they can prevent the occurrence of decryption failure in principle, and thus they are useful as an encrypted communication system or the like such as key delivery and content distribution.

The invention claimed is:

1. An encryption system comprising an encryption device, which generates an encrypted text by encrypting a plain text according to a predetermined cryptosystem, and a decryption device which generates a decrypted text by decrypting the encrypted text according to the predetermined cryptosystem, wherein said decryption device includes:
a key generation unit operable to
generate elements f and g in a ring R, generate an element Fq and an element Fp, with respect to the ring R, and generate ideals p and q of the ring R, the ring R being a set of N-dimensional arrays and defining addition, subtraction and multiplication, the element Fq being an inverse number of f(mod q), and the element Fp being an inverse number of f(mod p),
generate, as a public key, an element k which is congruent, modulo q, to a product derived as a result of multiplying the element g and the element Fq, and
generate, as a private key, information for obtaining the element f and the element Fp; and
a decryption unit operable to generate the decrypted text by decrypting the encrypted text using the private key,
wherein said encryption device includes an encryption unit operable to generate the encrypted text by encrypting the plain text using the public key and an element r randomly selected from the ring R,
wherein all of elements in an N-dimensional array of the N-dimensional arrays indicate 0 or 1, the N-dimensional array being the element f, g or r, or the plain text,
wherein the ideal p and the ideal q are relatively prime,
wherein the ideal q is expressed by q=(2^k)*R, where the ideal q is a set of multiples of (2^k) in the ring R, 2^k denotes a result of 1 multiplied k times by 2, and * denotes a multiplication of the ring R,
wherein said key generation unit is further operable to
generate the element f based on a non-negative integer df, which specifies a number of elements so that a value of the N-dimensional array indicates 1,
generate the element g based on a non-negative integer dg, which specifies a number of elements so that the value of the N-dimensional array indicates 1, and
select the element r based on a non-negative integer d, which specifies a number of elements, such that each of the elements satisfies that a value indicative of the N-dimensional array indicates 1,
wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

2. The encryption system according to claim 1, wherein the ideal p is expressed by p=3*R, where the ideal p is a set of multiples of 3 in the ring R.

3. The encryption system according to claim 1, wherein the ring R is a polynomial ring.

4. The encryption system according to claim 1, wherein said decryption unit is further operable to subject an element in the ring R to a process of reducing decryption failure probability, the element subjected to the process of reducing the decryption failure probability appearing in a process of generating the decrypted text.

5. The encryption system according to claim 4, wherein the process of reducing decryption failure probability is one of a center1 algorithm and a center2 algorithm according to an NTRU cryptosystem.

6. The encryption system according to claim 1, wherein the conditional expression is expressed by Min(dg, d)+df<(qg−1)/pg, where Min(a, b) indicates a smaller value between a and b.

7. An encryption system comprising an encryption device, which generates an encrypted text by encrypting a plain text according to a predetermined cryptosystem, and a decryption device which generates a decrypted text by decrypting the encrypted text according to the predetermined cryptosystem, wherein said decryption device includes:

a key generation unit operable to
generate elements f and g in a ring R, generate an element Fq with respect to the ring R, and generate ideals p and q of the ring R, the ring R being a set of N-dimensional arrays and defining addition, subtraction and multiplication, the element Fq being an inverse number of f(mod q),
generate, as a public key, an element h, which is congruent, modulo q, to a product derived as a result of multiplying the element g and the element Fq, and
generate, as a private key, information for obtaining the element f; and
a decryption unit operable to generate the decrypted text by decrypting the encrypted text using the private key,
wherein said encryption device includes an encryption unit operable to generate the encrypted text by encrypting the plain text using the public key and an element r randomly selected from the ring R, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by q=(2^k)*R, where the ideal q is a set of multiples of (2^k) in the ring R, 2^k denotes a result of 1 multiplied k times by 2, and * denotes a multiplication of the ring R, wherein said key generation unit is further operable to
generate the element f based on a non-negative integer df, which specifies a number of elements so that a value of the N-dimensional array indicates 1,
generate the element g based on a non-negative integer dg, which specifies a number of elements so that the value of the N-dimensional array indicates 1, and
select the element r based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, wherein the dimension N, the elements pg and qg, and the non-negative integers df, dg and d are derived based on a conditional expression indicating a condition for preventing an occurrence of decryption failure, wherein the non-negative integer df specifies the number of elements so that a value of an element in a N-dimensional array of an element F in the ring R, rather than a value of an element in a N-dimensional array of the element f, indicates 1, and wherein the private key is an element (1+pg*F) in the ring R.

8. The encryption system according to claim 1, wherein the predetermined cryptosystem is an NTRU cryptosystem.

9. An encryption device, which generates an encrypted text by encrypting a plain text according to a predetermined cryptosystem, said encryption device comprising an encryption unit operable to generate the encrypted text by encrypting the plain text using a public key and an element r randomly selected from a ring R, the ring R being a set of N-dimensional arrays, and defining, addition, subtraction and multiplication, wherein the predetermined cryptosystem is a cryptosystem in which the encryption of the plain text and a decryption of the encrypted text are performed based on a method including:

a key generation step of
generating elements f and g in a ring R, generating an element Fq and an element Fp, with respect to the ring R, and generating ideals p and q of the ring R, the element Fq being an inverse number of f(mod q), and the element Fp being an inverse number of f(mod p),
generating, as the public key, an element k which is congruent, modulo q, to a product derived as a result of multiplying the element g and the element Fq, and
generating, as the private key, information for obtaining the element f and the element Fp;
an encryption step of generating the encrypted text by encrypting the plain text using the public key and the element r randomly selected from the ring R; and
a decryption step of generating the decrypted text by decrypting the encrypted text using the private key, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by q=(2^k)*R, where the ideal q is a set of multiples of (2^k) in the ring R, wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

10. The encryption device according to claim 9, wherein the ideal p is expressed by p=3*R, where the ideal p is a set of multiples of 3 in the ring R.

11. The encryption device according to claim 9, wherein the ring R is a polynomial ring.

12. The encryption device according to claim 9, wherein the conditional expression is expressed by Min(dg, d)+df< (qg−1)/pg, where Min(a, b) indicates a smaller value between a and b.

13. The encryption device according to claim 9, wherein said predetermined cryptosystem is an NTRU cryptosystem.

14. A decryption device, which generates a decrypted text by decrypting an encrypted text according to a predetermined cryptosystem, said decryption device comprising:
a key generation unit operable to
generate elements f and g in a ring R, generate an element Fq, and an element Fp, with respect to a ring R, and generate ideals p and q of the ring R, the ring R being a set of N-dimensional arrays and defining addition, subtraction and multiplication, the element Fq being an inverse number of f(mod q), and the element Fp being an inverse number of f(mod p),
generate, as a public key, an element k which is congruent, modulo q, to a product derived as a result of multiplying the element g and the element Fq, and
generate, as a private key, information for obtaining the element f and the element Fp, and
a decryption unit operable to generate the decrypted text by decrypting the encrypted text using the private key,
wherein the predetermined cryptosystem is a cryptosystem in which the encryption of the plain text and the decryption of the encrypted text are performed based on a method including:
a key generation step of
generating the elements f and g in the ring R, generating the element Fq and the element Fp, with respect to the ring R, and generating the ideals p and q of the ring R,
generating, as the public key, the element h, which is congruent, modulo q, to the product derived by multiplying the element g and the element Fq, and
generating, as the private key, information for obtaining the element f and the element Fp;
an encryption step of generating the encrypted text by encrypting the plain text using the public key and an element r randomly selected from the ring R; and
a decryption step of generating the decrypted text by decrypting the encrypted text using the private key,
wherein all of elements in an N-dimensional array of the N-dimensional arrays indicate 0 or 1, the N-dimensional array being the element f, g or r, or the plain text,
wherein the ideal p and the ideal q are relatively prime,
wherein the ideal q is expressed by q=(2^k)*R, where the ideal q is a set of multiples of (2^k) in the ring R,
wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

15. The decryption device according to claim 14, wherein the ideal p is expressed by p=3*R, where the ideal p is a set of multiples of 3 in the ring R.

16. The decryption device according to claim 14, wherein the ring R is a polynomial ring.

17. The decryption device according to claim 14, wherein said decryption unit is further operable to subject an element in the ring R to a process of increasing a probability at which the decrypted text becomes the same as the encrypted text, the element subjected to the process of increasing the probability at which the decrypted text becomes the same as the encrypted text appearing in a process of generating the decrypted text.

18. The decryption device according to claim 17, wherein the process of increasing the probability that the decrypted text becomes the same as the encrypted text is one of a center1 algorithm and a center2 algorithm according to an NTRU cryptosystem.

19. The decryption device according to claim 14, wherein the conditional expression is expressed by Min(dg, d)+df< (qg−1)/pg, where Min(a, b) indicates a smaller value between a and b.

20. A decryption device, which generates a decrypted text by decrypting an encrypted text according to a predetermined cryptosystem, said decryption device comprising:
a key generation unit operable to
generate elements f and g in a ring R, generate an element Fq with respect to a ring R, and generate ideals p and q of the ring R, the ring R being a set of N-dimensional arrays and defining addition, subtraction and multiplication, the element Fq being an inverse number of f(mod q),
generate, as a public key, an element h, which is congruent, modulo q, to a product derived as a result of multiplying the element g and the element Fq, and
generate, as a private key, information for obtaining the element f; and
a decryption unit operable to generate the decrypted text by decrypting the encrypted text using the private key,
wherein the predetermined cryptosystem is a cryptosystem in which the encryption of the plain text and the decryption of the encrypted text are performed based on a method including:
a key generation step of
generating the elements f and g in the ring R, generating the element Fq, with respect to the ring R, and generating the ideals p and q of the ring R,
generating, as the public key, the element h, which is congruent, modulo q, to the product derived by multiplying the element g and the element Fq, and generating, as the private key, information for obtaining the element f;

an encryption step of generating the encrypted text by encrypting the plain text using the public key and an element r randomly selected from the ring R; and a decryption step of generating the decrypted text by decrypting the encrypted text using the private key, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by $q=(2^k)*R$, where the ideal q is a set of multiples of $(2^k)$ in the ring R, wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by $p=pg*R$ with respect to an element pg in the ring R, where the ideal p is a set of multiples of the element pg in the ring R, whereas the ideal q is expressed by $q=qg*R$ with respect to an element qg in the ring R, where the ideal q is a set of multiples of the element qg in the ring R, wherein the dimension N, the elements pg and qg, and the non-negative integers df, dg and d are derived based on a conditional expression indicating a condition for preventing an occurrence of decryption failure, wherein the non-negative integer df specifies the number of elements so that a value of an element in a N-dimensional array of an element F in the ring R, rather than a value indicative of an element in a N-dimensional array of the element f, indicates 1, and wherein the private key is an element $(1+pg*F)$ in the ring R.

21. The decryption device according to claim 14, wherein the predetermined cryptosystem is an NTRU cryptosystem.

22. An encryption method for generating an encrypted text by encrypting a plain text, and generating a decrypted text by decrypting the encrypted text, said encryption method comprising:

a key generation step of
generating elements f and g in a ring R, generating an element Fq, and an element Fp, with respect to the ring R, and generating ideals p and q of the ring R, the ring R being a set of N-dimensional arrays and defining addition, subtraction and multiplication, the element Fq being an inverse number of f(mod q), and the element Fp being an inverse number of f(mod p), generating, as a public key, an element h, which is congruent, modulo q, to a product derived as a result multiplying of the element g and the element Fq, and generating, as a private key, information for obtaining the element f and the element Fp;

an encryption step of generating, via a computer processor, the encrypted text by encrypting the plain text using the public key and an element r randomly selected from the ring R; and a decryption step of generating the decrypted text by decrypting the encrypted text using the private key, wherein said key generation step further includes:

generating the element f based on a non-negative integer df, which specifies a number of elements so that a value of the N-dimensional array indicates 1;

generating the element g based on a non-negative integer dg, which specifies a number of elements so that the value of the N-dimensional array indicates 1; and selecting the element r based on a non-negative integer d, which specifies a number of elements, such that each of the elements satisfies that a value indicative of the N-dimensional array indicates 1, wherein the ideal p is expressed by $p=pg*R$ with respect to an element pg in the ring R, where the ideal p is a set of multiples of the element pg in the ring R, whereas the ideal q is expressed by $q=qg*R$ with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

23. A non-transitory computer-readable recording medium having a program recorded thereon, the program causing a computer to function as an encryption device which generates an encrypted text by encrypting a plain text according to a predetermined cryptosystem, wherein said program causes the computer to function as an encryption unit operable to generate the encrypted text by encrypting the plain text using a public key and an element r randomly selected from a ring R, the ring R being a set of N-dimensional arrays, and defining, addition, subtraction and multiplication, wherein the predetermined cryptosystem is a cryptosystem in which the encryption of the plain text and a decryption of the encrypted text are performed based on a method including:

a key generation step of
generating elements f and g in a ring R, generating an element Fq, and an element Fp, with respect to the ring R, and generating ideals p and q of the ring R, the ring R being a set of N-dimensional arrays and defining addition, subtraction and multiplication, the element Fq being an inverse number of f(mod q), and the element Fp being an inverse number of f(mod p), generating, as a public key, an element h, which is congruent, modulo q, to a product derived as a result of multiplying the element g and the element Fq, and generating, as a private key, information for obtaining the element f and the element Fp;

an encryption step of generating the encrypted text by encrypting the plain text using the public key and the element r randomly selected from the ring R; and a decryption step of generating the decrypted text by decrypting the encrypted text using the private key, wherein all of element in an N-dimensional array of the N-dimensional arrays indicate 0 or 1, the N-dimensional array being the element f, g or r, or the plain text, wherein the ideal p and the ideal q are relatively prime, wherein the ideal q is expressed by $q=(2^{\wedge}k)*R$, where the ideal q is a set of multiples of $(2^{\wedge}k)$ in the ring R, wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

24. A non-transitory computer-readable recording medium having a program recorded thereon, the program causing a computer to function as a decryption device which generates a decrypted text by decrypting an encrypted text according to a predetermined cryptosystem, wherein said program causes the computer to function as:

a key generation unit operable to generate elements f and g in a ring R, generate an element Fq, and an element Fp, with respect to the ring R~ and generate ideals p and q of the ring R, the ring R being a set of N-dimensional arrays and defining addition, subtraction and multiplication, the element Fq being an inverse number of f(mod q), and the element Fp being an inverse number of f(mod p), generate, as a public key, an element h, which is congruent, modulo q, to a product derived as a result of multiplying the element g and the element Fq, and generate, as a private key, information for obtaining the element f and the element Fp; and a decryption unit operable to generate the decrypted text by decrypting the encrypted text using the private key, wherein the predetermined cryptosystem is a cryptosystem in which the encryption of the plain text and the decryption of the encrypted text are performed based on a method including:

a key generation step of generating the elements f and g in the ring R, generating the element Fq and the element Fp, with respect to the ring R, and generating the ideals p and q of the ring R, generating, as the public key, the element h, which is congruent, modulo q, to the product derived by the multiplying the element g and the element Fq, and generating, as the private key, information for obtaining the element f and the element Fp;

an encryption step of generating the encrypted text by encrypting the plain text using the public key and an element r randomly selected from the ring R; and a decryption step of generating the decrypted text by decrypting the encrypted text using the private key, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by q=(2Ak)*R, where the ideal q is a set of multiples of (2Ak) in the ring R, wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

25. An integrated circuit for generating an encrypted text by encrypting a plain text according to a predetermined cryptosystem, said integrated circuit comprising an encryption unit operable to generate the encrypted text by encrypting the plain text using an element r randomly selected from a ring R, the ring R being a set of N-dimensional arrays and defining addition, subtraction and multiplication, wherein the predetermined cryptosystem is a cryptosystem in which the encryption of the plain text and a decryption of the encrypted text are performed based on a method including:

a key generation step of generating elements f and g in the ring R, generating an element Fq and an element Fp, with respect to the ring R, and generating ideals p and q of the ring R, generating, as a public key, an element k which is congruent, modulo q, to a product derived as a result of multiplying the element g and the element Fq, and generating, as a private key, information for obtaining the element f and the element Fp;

an encryption step of generating the encrypted text by encrypting the plain text using the public key and an element r randomly selected from the ring R; and a decryption step of generating the decrypted text by decrypting the encrypted text using the private key, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by q=(2^k)*R, where the ideal q is a set of multiples of (2^k) in the ring R, wherein the element f is generated based on a non-negative integer df, which specifies a number of elements so that a value of the N-dimensional array indicates 1, wherein the element g is generated based on a non-negative integer dg, which specifies a number of elements so that the value of the N-dimensional array indicates 1, wherein the element r is selected based on a non-negative integer d, which specifies a number of elements, such that each of the elements satisfies that a value indicative of the N-dimensional array indicates 1, wherein the ideal p is expressed by p=pg*R with respect to an element pg in the ring R, where the ideal p is a set of multiples of the element pg in the ring R, whereas the ideal q is expressed by q=qg*R with respect to an element qg in the ring R, where the ideal q is a set of multiples of the element qg in the ring R, and wherein the dimension N, the elements pg and qg, and the non-negative integers df, dg and d are derived based on a conditional expression indicating a condition for preventing an occurrence of decryption failure.

26. An integrated circuit for generating a decrypted text by decrypting an encrypted text according to a predetermined cryptosystem, said integrated circuit comprising:

a key generation unit operable to
generate elements f and g in a ring R, generate an element Fq and an element Fp, with respect to a ring R, and generate ideals p and q of the ring R, the ring R being a set of N-dimensional arrays and defining addition, subtraction and multiplication, the element Fq being an inverse number of f(mod q), and the element Fp being an inverse number of f(mod p),
generate, as a public key, an element k which is congruent, modulo q, to a product derived as a result of multiplying the element g and the element Fq, and
generate, as a private key, information for obtaining the element f and the element Fp; and a decryption unit operable to generate the decrypted text by decrypting the encrypted text using the private key,
wherein the predetermined cryptosystem is a cryptosystem in which an encryption of a plain text and the decryption of the encrypted text are performed based on a method including:

a key generation step of
generating the elements f and g in the ring R, generating the element Fq, and the element Fp, with respect to the ring R, and generating the ideals p and q of the ring R,
generating, as the public key, the element k which is congruent, modulo q, to the product derived as the result of the multiplication of the element g and the element Fq, and
generating, as the private key, information for obtaining the element f and the element Fp;

an encryption step of generating the encrypted text by encrypting the plain text using the public key and the element r randomly selected from the ring R; and a decryption step of generating the decrypted text by decrypting the encrypted text using the private key,
wherein all of elements in an N-dimensional array of the N-dimensional arrays indicate 0 or 1, the N-dimensional array being the element f, g or r, or the plain text,
wherein the ideal p and the ideal q are relatively prime,
wherein the ideal q is expressed by $q=(2^k)*R$, where the ideal q is a set of multiples of $(2^k)$ in the ring R,
wherein the element f is generated based on a non-negative integer df, which specifies a number of elements so that a value of the N-dimensional array indicates 1,
wherein the element g is generated based on a non-negative integer dg, which specifies a number of elements so that the value of the N-dimensional array indicates 1,
wherein the element r is selected based on a non-negative integer d, which specifies a number of elements, such that each of the elements satisfies that a value indicative of the N-dimensional array indicates 1,
wherein the ideal p is expressed by $p=pg*R$ with respect to an element pg in the ring R, where the ideal p is a set of multiples of the element pg in the ring R, whereas the ideal q is expressed by $q=qg*R$ with respect to an element qg in the ring R, where the ideal q is a set of multiples of the element qg in the ring R, and
wherein the dimension N, the elements pg and qg, and the non-negative integers df, dg and d are derived based on a conditional expression indicating a condition for preventing an occurrence of decryption failure.

27. An encryption system comprising a key generation device which generates a key, an encryption device which generates an encrypted text by encrypting a plain text according to a predetermined cryptosystem, and a decryption device which generates a decrypted text by decrypting the encrypted text according to the predetermined cryptosystem, wherein said key generation device includes a key generation unit operable to
generate elements f and g in a ring R, generate an element Fq and an element Fp, with respect to the ring R, and generate ideals p and q of the ring R, the ring R being a set of N-dimensional arrays and defining addition, subtraction and multiplication, the element Fq being an inverse number of f(mod q), and the element Fp being an inverse number of f(mod p),
generate, as a public key, an element h, which is congruent, modulo q, to a product derived as a result of multiplying the element g and the element Fq, and
generate, as a private key, information for obtaining the element f and the element Fp, wherein said decryption device includes a decryption unit operable to generate the decrypted text by decrypting the encrypted text using the private key generated by said key generation unit of said key generation device,
wherein said encryption device includes an encryption unit operable to generate the encrypted text by encrypting the plain text using the public key and an element r randomly selected from the ring R,
wherein all of elements in an N-dimensional array of the N-dimensional arrays indicate 0 or 1, the N-dimensional array being the element f, g or r, or the plain text,
wherein the ideal p and the ideal q are relatively prime,
wherein the ideal q is expressed by $q=(2^k)*R$, where the ideal q is a set of multiples of $(2^k)$ in the ring R, $2^k$ denotes a result of 1 multiplied k times by 2, and * denotes a multiplication of the ring R,
wherein said key generation unit is further operable to
generate the element f based on a non-negative integer df, which specifies a number of elements so that a value of the N-dimensional array indicates 1,
generate the element g based on a non-negative integer dg, which specifies a number of elements so that the value of the N-dimensional array indicates 1, and
select the element r based on a non-negative integer d, which specifies a number of elements, such that each of the elements satisfies that a value indicative of the N-dimensional array indicates 1,
wherein the ideal p is expressed by $p=pg*R$ with respect to an element pg in the ring R, where the ideal p is a set of multiples of the element pg in the ring R, whereas the ideal q is expressed by $q=qg*R$ with respect to an element qg in the ring R, where the ideal q is a set of multiples of the element qg in the ring R, and
wherein the dimension N, the elements pg and qg, and the non-negative integers df, dg and d are derived based on a conditional expression indicating a condition for preventing an occurrence of decryption failure.

28. An encryption system comprising a key generation device which generates a key, an encryption device, which generates an encrypted text by encrypting a plain text according to a predetermined cryptosystem, and a decryption device which generates a decrypted text by decrypting the encrypted text according to the predetermined cryptosystem, wherein said key generation device includes a key generation unit operable to
generate elements f and g in a ring R, generate an element Fq with respect to the ring R, and generate ideals p and q of the ring R, the ring R being a set of N-dimensional arrays and defining addition, subtraction and multiplication, the element Fq being an inverse number of f(mod q), generate, as a public key, an element h, which is congruent, modulo q, to a product derived as a result of multiplying the element g and the element Fq, and generate, as a private key, information for obtaining the element f, wherein said decryption device includes a decryption unit operable to generate the decrypted text by decrypting the encrypted text using the private key generated by said key generation unit of said key generation device, wherein said encryption device includes an encryption unit operable to generate the encrypted text by encrypting the plain text using the public key and an element r randomly selected from the ring R, wherein all of elements in an N-dimensional array of the N-dimensional arrays indicate 0 or 1, the N-dimensional array being the element f, g or r, or the plain text, wherein the ideal p and the ideal q are relatively prime, wherein the ideal q is expressed by $q=(2^k)*R$, where the ideal q is a set of multiples of $(2^k)$ in the ring R, $2^k$ denotes a result of 1 multiplied k times by 2, and * denotes a multiplication of the ring R, wherein said key generation unit is further operable to
generate the element f based on a non-negative integer df, which specifies a number of elements so that a value of the N-dimensional array indicates 1,
generate the element g based on a non-negative integer dg, which specifies a number of elements so that the value of the N-dimensional array indicates 1, and
select the element r based on a non-negative integer d, which specifies a number of elements, such that each of the elements satisfies that a value indicative of the N-dimensional array indicates 1, wherein the ideal p is expressed by $p=pg*R$ with respect to an element pg in the ring R, where the ideal p is a set of multiples of the element pg in the ring R, whereas the ideal q is expressed by $q=qg*R$ with respect to an element qg in the ring R, where the ideal q is a set of multiples of the element qg in the ring R, wherein the dimension N, the elements pg and qg, and the non-negative integers df, dg and d are derived based on a conditional expression indicating a condition for preventing an occurrence of decryption failure, wherein the non-negative integer df specifies the number of elements so that a value of an element in a N-dimensional array of an element F in the ring R, rather than a value of an element in a N-dimensional array of the element f, indicates 1, and wherein the private key is an element $(1+pg*F)$ in the ring R.

* * * * *

UNITED STATES PATENT AND TRADEMARK OFFICE
CERTIFICATE OF CORRECTION

| | | |
|---|---|---|
| PATENT NO. | : 7,773,746 B2 | |
| APPLICATION NO. | : 10/592387 | |
| DATED | : August 10, 2010 | |
| INVENTOR(S) | : Futa et al. | |

It is certified that error appears in the above-identified patent and that said Letters Patent is hereby corrected as shown below:

In column 36, claim 1, line 34, "an element k" should read -- an element h --.

Signed and Sealed this
Eighteenth Day of January, 2011

David J. Kappos
*Director of the United States Patent and Trademark Office*